(12) United States Patent
Kandade Rajan et al.

(10) Patent No.: US 11,017,798 B2
(45) Date of Patent: May 25, 2021

(54) DYNAMIC NOISE SUPPRESSION AND OPERATIONS FOR NOISY SPEECH SIGNALS

(71) Applicant: Harman Becker Automotive Systems GmbH, Karlsbad-Ittersbach (DE)

(72) Inventors: Vasudev Kandade Rajan, Straubing (DE); Markus E. Christoph, Straubing (DE); Juergen Heinrich Zollner, Straubing (DE)

(73) Assignee: HARMAN BECKER AUTOMOTIVE SYSTEMS GMBH, Karlsbad-Ittersbach (DE)

( * ) Notice: Subject to any disclaimer, the term of this patent is extended or adjusted under 35 U.S.C. 154(b) by 7 days.

(21) Appl. No.: 16/226,383

(22) Filed: Dec. 19, 2018

(65) Prior Publication Data

US 2019/0206420 A1 Jul. 4, 2019

(30) Foreign Application Priority Data

Dec. 29, 2017 (DE) .......................... 102017223872.0
Dec. 29, 2017 (EP) ..................................... 17211066
Dec. 29, 2017 (EP) ..................................... 17211068

(51) Int. Cl.
*G10L 21/0264* (2013.01)
*G10L 15/20* (2006.01)
(Continued)

(52) U.S. Cl.
CPC .......... *G10L 21/0264* (2013.01); *G10L 15/20* (2013.01); *G10L 21/0224* (2013.01);
(Continued)

(58) Field of Classification Search
CPC ..... G10L 21/0264; G10L 15/20; G10L 25/15; G10L 21/0224; G10L 21/0232; G10L 21/0216
See application file for complete search history.

(56) References Cited

U.S. PATENT DOCUMENTS 6,477,489 B1 * 11/2002 Lockwood .......... G10L 21/0208
381/94.3
8,326,617 B2 * 12/2012 Hetherington ........ G10L 19/012
704/201

(Continued)

*Primary Examiner* — Stella L. Woo
(74) *Attorney, Agent, or Firm* — McCoy Russell LLP

(57) ABSTRACT

Systems and methods for noise reduction are provided including operations for noisy speech signals, such as speech signals that are subject to speech processing, speech recognition and speech transmission for voice communication purposes. In one embodiment, a system for noise suppression includes an input smoothing filter to smooth magnitudes of the input spectrum, a desired noise shape determination block configured to determine a desired noise shape of the noise spectrum dependent on the smoothed-magnitude input spectrum, and a suppression factors determination block configured to determine a set of suppression factors based on the desired noise shape and the smoothed-magnitude input spectrum. In one embodiment, a filter coefficient determination block is configured to determine noise suppression filter coefficients from the desired noise shape of the noise spectrum. Embodiments are also directed to systems and methods for noise reduction. System configurations and processes are provided for formant detection.

18 Claims, 9 Drawing Sheets
(2 of 9 Drawing Sheet(s) Filed in Color)

(51) Int. Cl.
  *G10L 25/15*   (2013.01)
  *G10L 21/0224*   (2013.01)
  *G10L 21/0232*   (2013.01)
  *G10L 21/0216*   (2013.01)

(52) U.S. Cl.
  CPC .......... *G10L 21/0232* (2013.01); *G10L 25/15* (2013.01); *G10L 21/0216* (2013.01)

(56) References Cited

U.S. PATENT DOCUMENTS

| | | |
|---|---|---|
| 8,462,958 B2 | 6/2013 | Kuech et al. |
| 9,978,394 B1* | 5/2018 | Su .................. G10L 21/0232 |
| 2007/0033020 A1* | 2/2007 | (Kelleher) Francois ................... G10L 21/0208 704/226 |
| 2009/0112584 A1* | 4/2009 | Li .................. G10L 21/0208 704/233 |
| 2011/0019833 A1 | 1/2011 | Kuech et al. |
| 2014/0309992 A1* | 10/2014 | Carney .................. G10L 21/02 704/209 |
| 2016/0035370 A1* | 2/2016 | Krini .................. G10L 21/0232 704/209 |
| 2016/0372133 A1* | 12/2016 | Daniel .................. G10L 19/06 |
| 2018/0075859 A1* | 3/2018 | Song .................. G10L 21/0216 |

\* cited by examiner

DYNAMIC NOISE SUPPRESSION AND OPERATIONS FOR NOISY SPEECH SIGNALS

CROSS-REFERENCE TO RELATED APPLICATION

This application claims priority to European Patent Application No. EP17211068.6 filed on Dec. 29, 2017 titled DYNAMIC NOISE SUPPRESSION, German Patent Application No. DE102017223872.0 filed on Dec. 29, 2017 titled NOISE REDUCTION OF NOISY SPEECH SIGNALS, and European Patent Application No. EP17211066.0 filed on Dec. 29, 2017 titled FORMANT DETECTION IN NOISY SPEECH SIGNALS, the content of which is expressly incorporated by reference in its entirety.

FIELD

The present disclosure generally relates to systems and methods for noise reduction and operations for noisy speech signals, such as speech signals that are subject to speech processing, speech recognition and speech transmission for voice communication purposes.

BACKGROUND

Speech is normally made up of utterances with gaps in between referred to as speech pauses. The gaps between utterances would be nearly soundless in a quiet environment, but contain noise when the speech takes place in a noisy environment. The noise results in structures in the spectrum that often cause errors in speech processing applications, such as automatic speech recognition, front-end processing in distributed automatic speech recognition, speech enhancement, echo cancellation, and speech coding. For example, in the case of a speech recognition system, insertion errors may be caused since the system interprets any structure it encounters as one of the range of words it has been trained to recognize. This results in the insertion of false-positive word identifications.

In conventional speech processing systems, a noise estimate is usually obtained only during the gaps between utterances and is assumed to remain the same during an utterance until the next gap, when the noise estimate can be updated. Many speech enhancement/noise mitigation methods assume full knowledge of the short-term noise spectrum. This assumption holds true in the case of stationary noise. That is, noise whose spectral characteristics do not change over the duration of the utterance. An example would be a car driving at steady speed on a uniform road surface. However, in many real-world environments the noise is non-stationary. Examples include a busy street with passing vehicles, or on a train, where the sound of the rails form a staccato accompaniment to the speech. Thus, an improved noise reduction of a noisy speech signal is desired that is applicable in speech processing systems such as speech communication or speech recognition.

BRIEF SUMMARY OF THE EMBODIMENTS

Disclosed and claimed herein are systems and methods for noise suppression. According to one embodiment, a noise suppression system is provided including an input domain transformer configured to receive a time-domain input signal and to transform the time-domain input signal into an input spectrum that is the spectrum of the input signal. The input signal includes speech components and noise components, and the input spectrum including a speech spectrum that is the spectrum of the speech components and a noise spectrum that is the spectrum of the noise components. The system also includes an input smoothing filter operatively coupled with the input domain transformer and configured to smooth magnitudes of the input spectrum to provide a smoothed-magnitude input spectrum. The system also includes a desired noise shape determination block operatively coupled with the input smoothing filter and configured to determine a desired noise shape of the noise spectrum dependent on the smoothed-magnitude input spectrum. The system also includes a suppression factors determination block operatively coupled with the desired noise shape determination block and the input smoothing filter, and configured to determine a set of suppression factors based on the desired noise shape and the smoothed-magnitude input spectrum. The system also includes a filter coefficient determination block coupled with the suppression factors determination block and configured to determine noise suppression filter coefficients from the desired noise shape of the noise spectrum.

In one embodiment, the desired noise shape determination block is further configured to determine the desired noise shape of the noise spectrum based on a long-term estimate of the smoothed-magnitude input spectrum.

In one embodiment, the desired noise shape determination block is further configured to determine the desired noise shape of the noise spectrum by multiplying a previous estimate of the noise magnitude shape of the smoothed-magnitude input spectrum with a dynamically calculated value or an incremental or decremental constant, depending on ratio sign and level.

In one embodiment, the desired noise shape determination block is further configured to determine the desired noise magnitude shape of the noise spectrum by dynamically determining a ratio of a current frame to a desired magnitude of the desired noise magnitude shape based on a threshold which can be changed or tuned.

In one embodiment, determining the desired noise magnitude shape of the noise spectrum by the desired noise shape determination block includes an individual hold time, during which the desired noise magnitude shape determination of passing thresholds follows the previous function rule until the hold time expires.

In one embodiment, the suppression factors determination block is further configured to apply an over-estimation factor to adjust the overall level of the desired noise magnitude shape.

In one embodiment, the system further includes a sub-band domain smoothing filter operatively coupled to the suppression factors determination block and to the filter coefficient determination block, and configured to smooth suppression factors along a frequency axis.

In one embodiment, the suppression factors are smoothed along the frequency axis with a zero-phase infinite impulse response filter.

In one embodiment, the filter coefficient determination block is further configured to determine the noise suppression filter coefficients by shifting the suppression factors by an amount representative of a desired suppression.

In one embodiment, the filter coefficient determination block noise suppression filter is further configured to determine the noise suppression filter coefficients dependent on tunable parameters.

According to another embodiment, a noise suppression method is provided. The method includes transforming a time-domain input signal into an input spectrum that is the spectrum of the input signal, the input signal including speech components and noise components, and the input spectrum including a speech spectrum that is the spectrum of the speech components and a noise spectrum that is the spectrum of the noise components. The method also includes smoothing magnitudes of the input spectrum to provide a smoothed-magnitude input spectrum. The method also includes determining a desired noise shape of the noise spectrum dependent on the smoothed-magnitude input spectrum. The method also includes determining a set of suppression factors based on the desired noise shape and the smoothed-magnitude input spectrum. The method also includes determining noise suppression filter coefficients from the desired noise shape of the noise spectrum.

In one embodiment, determining a desired noise shape of the noise spectrum is further configured to determine the desired noise shape of the noise spectrum based on a long-term estimate of the smoothed-magnitude input spectrum.

In one embodiment, determining a desired noise shape of the noise spectrum is further configured to determine the desired noise shape of the noise spectrum by multiplying a previous estimate of the noise magnitude shape of the smoothed-magnitude input spectrum with a dynamically calculated value or an incremental or decremental constant, depending on a ratio sign and level.

In one embodiment, determining a desired noise shape of the noise spectrum is further configured to determine the desired noise magnitude shape of the noise spectrum by dynamically determining a ratio of a current frame to a desired magnitude of the desired noise magnitude shape based on a threshold which can be changed or tuned.

In one embodiment, determining the desired noise magnitude shape of the noise spectrum by the desired noise shape determination block includes an individual hold time, during which the desired noise magnitude shape determination of passing thresholds follows a previous function rule until the hold time expires.

In one embodiment, determining the set of suppression factors is further configured to apply an over-estimation factor to adjust the overall level of the desired noise magnitude shape.

In one embodiment, the method further includes sub-band domain smoothing configured to smooth suppression factors along a frequency axis.

In one embodiment, the suppression factors are smoothed along the frequency axis by zero-phase infinite impulse response filtering.

In one embodiment, determining the filter coefficients is further configured to determine the noise suppression filter coefficients by shifting the suppression factors by an amount representative of a desired suppression.

In one embodiment, determining the filter coefficients is further configured to determine the noise suppression filter coefficients dependent on tunable parameters.

Another embodiment is directed to a noise reduction system. The system includes an input domain transformer configured to receive a time-domain input signal and to transform the time-domain input signal into an input spectrum that is the spectrum of the input signal. The input signal includes speech components and noise components, and the input spectrum includes a speech spectrum that is the spectrum of the speech components and a noise spectrum that is the spectrum of the noise components. The system also includes an input smoothing filter operatively coupled with the input domain transformer and configured to smooth magnitudes of the input spectrum to provide a smoothed-magnitude input spectrum. The system also includes a noise estimator operatively coupled with the input smoothing filter and configured to estimate, from the smoothed-magnitude input spectrum, magnitudes of the noise spectrum to provide an estimated noise spectrum. The system also includes a Wiener filter coefficient estimator operatively coupled with the noise estimator and the domain transformer, and configured to provide Wiener filter coefficients, the Wiener filter coefficients being based on the estimated noise spectrum. The system also includes a suppression filter controller operatively coupled with the Wiener filter coefficient estimator and configured to determine, based on the estimated Wiener filter coefficients, noise suppression filter coefficients. The system also includes a noise suppression filter operatively coupled with the suppression filter controller and the input domain transformer, and configured to filter the input spectrum according to the noise suppression filter coefficients to provide an estimated clean speech spectrum. The system also includes an output domain transformer operatively coupled with the noise suppression filter and configured to transform the estimated clean speech spectrum into a time-domain output signal, the output signal being representative of the noise components of the input signal.

In one embodiment, the system also includes a dynamic suppression estimator operatively coupled with the input domain transformer and the input smoothing filter, the dynamic suppression estimator being configured to suppress to a certain amount the input spectrum in a time-frequency controlled manner to provide dynamic suppression filter coefficients.

In one embodiment, the amount of suppression that is applied is determined by the dynamicity of the noise in the noisy input signal.

In one embodiment, a reference domain transformer is configured to receive a time-domain reference signal and to transform the time-domain reference signal into a reference spectrum being the spectrum of the reference signal. A level estimator and scaling controller are operatively coupled to the reference domain transformer and to the input domain transformer, the level estimator and scaling controller being configured to estimate a scaling value based on the input spectrum the reference spectrum to provide a time-varying scaling signal.

In one embodiment, the system also includes a reference smoothing filter operatively coupled with the reference domain transformer and the level estimator and scaling controller, the reference smoothing filter being configured to smooth magnitudes of the reference spectrum to provide a smoothed-magnitude input spectrum to the level estimator and scaling controller.

In one embodiment, the system also includes an interframe formant detector operatively coupled with the suppression filter controller, the input smoothing filter and the level estimator and scaling controller, the interframe formant detector being configured to provide, based on the time-varying scaling signal and the smoothed input spectrum, a formant detection signal to the suppression filter controller.

In one embodiment, the suppression filter controller is further configured to combine or switch between the Wiener filter coefficients and the dynamic suppression filter coefficients dependent on the formant detection signal.

In one embodiment, the system also includes a comfort noise adder operatively coupled with the suppression filter, the interframe formant detector and the output domain transformer, the comfort noise adder being configured to add comfort noise to the estimated clean speech spectrum and to supply the estimated clean speech spectrum with added comfort noise to the output domain transformer.

In one embodiment, the reference signal is provided by a higher level system that includes the noise reduction system.

Another embodiment is directed to a noise reduction method. In one embodiment, the method includes transforming a time-domain input signal into an input spectrum that is the spectrum of the input signal, the input signal including speech components and noise components, and the input spectrum including a speech spectrum that is the spectrum of the speech components and a noise spectrum that is the spectrum of the noise components. The method includes smoothing magnitudes of the input spectrum to provide a smoothed-magnitude input spectrum. The method also includes estimating from the smoothed-magnitude input spectrum magnitudes of the noise spectrum to provide an estimated noise spectrum. The method also includes determining Wiener filter coefficients based on the estimated noise spectrum, and determining, based on the estimated Wiener filter coefficients, noise suppression filter coefficients. The method also includes filtering the input spectrum according to the noise suppression filter coefficients to provide an estimated clean speech spectrum. The method also includes transforming the estimated clean speech spectrum into a time-domain output signal, the output signal being representative of the noise components of the input signal.

In one embodiment, the method also includes suppressing to a certain amount the input signal in a time-frequency controlled manner to provide dynamic suppression filter coefficients.

In one embodiment, the amount of suppression that is applied is determined by the dynamicity of the noise in the noisy input signal.

In one embodiment, the method also includes transforming the time-domain reference signal into a reference spectrum that is the spectrum of the reference signal, and estimating a scaling value based on the reference spectrum to provide a time-varying scaling signal.

In one embodiment, the method also includes smoothing magnitudes of the reference spectrum to provide a smoothed-magnitude input spectrum as a basis for estimating the scaling value.

In one embodiment, the method also includes providing, based on the time-varying scaling signal and the smoothed input spectrum, a formant detection signal as a basis for providing the estimated clean speech spectrum.

In one embodiment, the method also includes combining or switching between the Wiener filter coefficients and the dynamic suppression filter coefficients dependent on the formant detection signal.

In one embodiment, the method also includes adding comfort noise to the estimated clean speech spectrum and transforming the estimated clean speech spectrum with the added comfort noise into the time-domain output signal.

In one embodiment, the reference signal is provided by a higher level system that includes or performs the noise reduction method.

Another embodiment is directed to a formant detection system including an input domain transformer configured to receive a time-domain input signal and to transform the time-domain input signal into an input spectrum that is the spectrum of the input signal, the time-domain input signal including a speech signal with formants and the input spectrum including a first number of subbands. The system includes an input smoothing filter operatively coupled with the input domain transformer and configured to smooth magnitudes of the input spectrum to provide a smoothed-magnitude input spectrum. The system also includes a detection block operatively coupled to the input smoothing filter and configured to perform a spectral auto-correlation operation on the smoothed input spectrum over a second number of subbands to output an auto-correlation factor indicative of a presence of formants included in the input signal, the second number of subbands being equal to or less than the first number.

In one embodiment, the detection block is further configured to normalize the auto-correlation factor by dividing the auto-correlation factor by the second number plus one to provide a normalized correlation factor.

In one embodiment, the second number of subbands is equal to or less than the first number.

In one embodiment, the detection block is further configured to scale the smoothed input spectrum by multiplying the smoothed input spectrum with a scaling factor to provide a scaled smoothed input spectrum before performing the auto-correlation.

In one embodiment, the system also includes a scaling controller operatively coupled to the detection block and configured to determine the scaling factor from a one-to-one mapping function based on estimated levels of the smoothed input spectrum.

In one embodiment, the system also includes an input spectrum level estimator operatively coupled to the input smoothing filter and configured to provide the estimated levels of the smoothed input spectrum by determining a long-term average of the smoothed input spectrum.

In one embodiment, the input spectrum level estimator is further configured to determine the long-term average by performing a time window averaging a number of frames of estimated instant levels of the smoothed input spectrum, thereby providing a time-window average of the estimated smoothed input spectrum.

In one embodiment, the input spectrum level estimator is further configured to determine the long-term average by performing an infinite impulse response filter based smoothing of the time-window average of the estimated smoothed input spectrum.

In one embodiment, the system also includes a reference domain transformer configured to receive a time-domain reference signal and to transform the time-domain reference signal into a reference spectrum that is the spectrum of the reference signal. The system also includes a reference smoothing filter operatively coupled with the reference domain transformer and the input spectrum level estimator and scaling controller, the reference smoothing filter being configured to smooth magnitudes of the reference spectrum to provide a smoothed-magnitude input spectrum. The input spectrum level estimator is further operatively coupled to the reference domain transformer, the level estimator further configured to estimate the time-window average of the smoothed input spectrum based on the input spectrum and the reference spectrum.

In one embodiment, the system also includes a reference background noise estimator operatively coupled to reference smoothing filter and configured to estimate the background noise contained in the smoothed reference spectrum. The system also includes a masking block operatively coupled to reference background noise estimator and the input spectrum level estimator, the masking block configured to mask the smoothed input spectrum with a mask derived from the background noise contained in the smoothed reference spectrum.

Another embodiment is directed to a formant detection method. The method includes receiving a time-domain input signal and transforming the time-domain input signal into an input spectrum being the spectrum of the input signal, the time-domain input signal including a speech signal with formants and the input spectrum including a first number of subbands, smoothing magnitudes of the input spectrum to provide a smoothed-magnitude input spectrum, and performing a spectral auto-correlation operation on the smoothed input spectrum over a second number of subbands to output an auto-correlation factor indicative of a presence of formants included in the input signal, the second number of subbands being equal to or less than the first number.

In one embodiment, the method also includes normalizing the auto-correlation factor by dividing the auto-correlation factor by the second number of subbands plus one to provide a normalized correlation factor.

In one embodiment, the second number of subbands being equal to or less than the first number.

In one embodiment, the method also includes scaling the smoothed input spectrum by multiplying the smoothed input spectrum with a scaling factor to provide a scaled smoothed input spectrum before performing the auto-correlation.

In one embodiment, the method also includes determining the scaling factor from a one-to-one mapping function based on estimated levels of the smoothed input spectrum.

In one embodiment, the method also includes providing the estimated levels of the smoothed input spectrum by determining a long-term average of the smoothed input spectrum.

In one embodiment, the method also includes determining the long-term average by performing a time window averaging a number of frames of estimated instant levels of the smoothed input spectrum, thereby providing a time-window average of the estimated smoothed input spectrum.

In one embodiment, determining the long-term average includes performing an infinite impulse response filter based smoothing of the time-window average of the estimated smoothed input spectrum.

In one embodiment, the method also includes receiving a time-domain reference signal and transforming the time-domain reference signal into a reference spectrum being the spectrum of the reference signal, and smoothing magnitudes of the reference spectrum to provide a smoothed-magnitude input spectrum. Estimating the levels of the smoothed input spectrum includes estimating the time-window average of the smoothed input spectrum based on the input spectrum the reference spectrum.

In one embodiment, the method also includes estimating the background noise contained in the smoothed reference spectrum, and masking the smoothed input spectrum with a mask derived from the background noise contained in the smoothed reference spectrum.

Another embodiment is directed to a computer program product including instructions which, when the program is executed by a computer, cause the computer to carry out the method described herein.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

Figure 1:
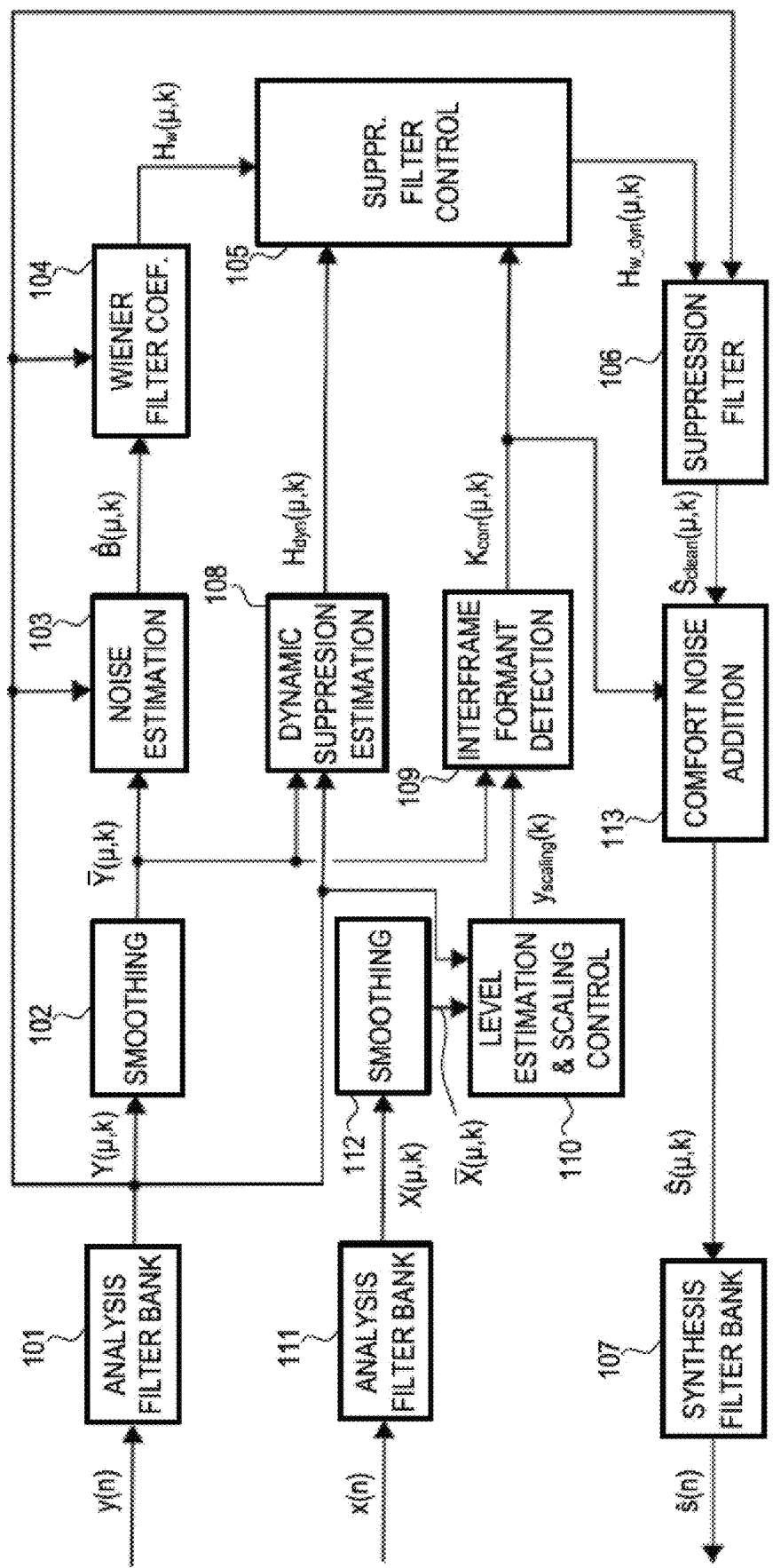
FIG. 1 is a schematic diagram illustrating an exemplary system for reducing noise according to one or more embodiments.

The patent or application file contains at least one drawing executed in color. Copies of this patent or patent application publication with color drawing(s) will be provided by the Office upon request and payment of the necessary fee.

DETAILED DESCRIPTION OF THE EXEMPLARY EMBODIMENTS

Overview and Terminology

One aspect of the disclosure is directed to noise suppression including dynamic noise suppression. In one embodiment, a noise suppression system includes an input domain transformer configured to receive a time-domain input signal and to transform the time-domain input signal into an input spectrum being the spectrum of the input signal, the input signal including speech components and noise components, and the input spectrum including a speech spectrum being the spectrum of the speech components and a noise spectrum being the spectrum of the noise components. The system further includes an input smoothing filter operatively coupled with the input domain transformer and configured to smooth magnitudes of the input spectrum to provide a smoothed-magnitude input spectrum, and a desired noise shape determination block operatively coupled with the input smoothing filter and configured to determine a desired noise shape of the noise spectrum dependent on the smoothed-magnitude input spectrum. The system further includes a suppression factors determination block operatively coupled with the desired noise shape determination block and the input smoothing filter, and configured to determine a set of suppression factors based on the desired noise shape and the smoothed-magnitude input spectrum, and includes a filter coefficient determination block coupled with the suppression factors determination block and configured to determine noise suppression filter coefficients from the desired noise shape of the noise spectrum.

A noise suppression method includes transforming a time-domain input signal into an input spectrum being the spectrum of the input signal, the input signal including speech components and noise components, and the input spectrum including a speech spectrum being the spectrum of the speech components and a noise spectrum being the spectrum of the noise components. The method further includes smoothing magnitudes of the input spectrum to provide a smoothed-magnitude input spectrum, determining a desired noise shape of the noise spectrum dependent on the smoothed-magnitude input spectrum, determining a set of suppression factors based on the desired noise shape and the smoothed-magnitude input spectrum, and determining noise suppression filter coefficients from the desired noise shape of the noise spectrum.

Another aspect of the disclosure is directed to noise reduction of noisy speech signals. In one embodiment, a noise reduction system includes an input domain transformer configured to receive a time-domain input signal and to transform the time-domain input signal into an input spectrum being the spectrum of the input signal, the input signal including speech components and noise components, and the input spectrum including a speech spectrum that is the spectrum of the speech components and a noise spectrum that is the spectrum of the noise components. The system further includes an input smoothing filter operatively coupled with the input domain transformer and configured to smooth magnitudes of the input spectrum to provide a smoothed-magnitude input spectrum, a noise estimator operatively coupled with the input smoothing filter and configured to estimate, from the smoothed-magnitude input spectrum, magnitudes of the noise spectrum to provide an estimated noise spectrum, and a Wiener filter coefficient estimator operatively coupled with the noise estimator and the domain transformer, and configured to provide Wiener filter coefficients, the Wiener filter coefficients being based on the estimated noise spectrum. The system further includes a suppression filter controller operatively coupled with the Wiener filter coefficient estimator and configured to determine, based on the estimated Wiener filter coefficients, noise suppression filter coefficients, a noise suppression filter operatively coupled with the suppression filter controller and the input domain transformer, and configured to filter the input spectrum according to the noise suppression filter coefficients to provide an estimated clean speech spectrum, and an output domain transformer operatively coupled with the noise suppression filter and configured to transform the estimated clean speech spectrum into a time-domain output signal, the output signal being representative of the noise components of the input signal.

A noise reduction method includes transforming a time-domain input signal into an input spectrum that is the spectrum of the input signal, the input signal including speech components and noise components, and the input spectrum including a speech spectrum that is the spectrum of the speech components and a noise spectrum that is the spectrum of the noise components. The method further includes smoothing magnitudes of the input spectrum to provide a smoothed-magnitude input spectrum, estimating from the smoothed-magnitude input spectrum magnitudes of the noise spectrum to provide an estimated noise spectrum, and determining Wiener filter coefficients based on the estimated noise spectrum. The method further includes determining, based on the estimated Wiener filter coefficients, noise suppression filter coefficients, filtering the input spectrum according to the noise suppression filter coefficients to provide an estimated clean speech spectrum, and transforming the estimated clean speech spectrum into a time-domain output signal, the output signal being representative of the noise components of the input signal.

Another aspect of the disclosure is directed to formant detection in noisy speech signals. A formant detection system includes an input domain transformer configured to receive a time-domain input signal and to transform the time-domain input signal into an input spectrum being the spectrum of the input signal, the time-domain input signal including a speech signal with formants and the input spectrum including a first number of subbands. The system further includes an input smoothing filter operatively coupled with the input domain transformer and configured to smooth magnitudes of the input spectrum to provide a smoothed-magnitude input spectrum, and a detection block operatively coupled to the input smoothing filter and configured to perform a spectral auto-correlation operation on the smoothed input spectrum over a second number of subbands to output an auto-correlation factor indicative of a presence of formants included in the input signal, the second number of subbands being equal to or less than the first number.

A formant detection method includes receiving a time-domain input signal and transforming the time-domain input signal into an input spectrum being the spectrum of the input signal, the time-domain input signal including a speech signal with formants and the input spectrum including a first number of subbands. The method further includes smoothing magnitudes of the input spectrum to provide a smoothed-magnitude input spectrum, and performing a spectral auto-correlation operation on the smoothed input spectrum over a second number of subbands to output an auto-correlation factor indicative of a presence of formants included in the input signal, the second number being equal to or less than the first number.

Applications include noise reduction for automotive applications (e.g., hands free systems, etc.), and consumer electronics (e.g., mobile phones, telephone applications, mobile smart speakers, with microphones, etc.).

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

FIG. 1 illustrates an exemplary system for reducing noise, also referred to as noise reduction (NR) system, included in a noisy speech signal y(n), wherein n designates discrete-time domain samples. In the system shown in FIG. 1, an input (time-to-frequency) domain transformer, e.g., an analysis filter bank 101, transforms the time-domain input signal y(n) into a spectrum of the input signal y(n), an input spectrum Y(µ,k), wherein (µ,k) designates a µth subband for a time-frame k. The input signal y(n) is a noisy speech signal, i.e., it includes speech components and noise components. Accordingly, the input spectrum Y(µ,k) includes a speech spectrum that is the spectrum of the speech components and a noise spectrum that is the spectrum of the noise components. A smoothing filter 102 operatively coupled with the analysis filter bank 101 is configured to smooth magnitudes of the input spectrum Y(µ,k) to provide a smoothed-magnitude input spectrum $\overline{Y}(\mu, k)$. A noise estimator 103 operatively coupled with the smoothing filter 102 and the analysis filter bank 101 estimates, based on the smoothed-magnitude input spectrum $\overline{Y}(\mu, k)$ and the input spectrum Y(µ,k), magnitudes of the noise spectrum to provide an estimated noise spectrum $\hat{B}(\mu,k)$. A Wiener filter coefficient estimator 104 operatively coupled with the noise estimator 103 and the analysis filter bank 101 provides estimated Wiener filter coefficients $H_w(\mu,k)$ based on the estimated noise spectrum B(µ,k) and the input spectrum Y(µ,k).

A suppression filter controller 105 operatively coupled to the Wiener filter coefficient estimator 104 estimates (dynamic) suppression filter coefficients $H_{w\_dyn}(\mu,k)$, based on the estimated Wiener filter coefficients $H_w(\mu,k)$ and optionally at least one of a correlation factor $K_{corr}(\mu,k)$ for formant based detection and estimated noise suppression filter coefficients $H_{dyn}(\mu,k)$. A noise suppression filter 106, which is operatively coupled with the suppression filter controller 105 and the analysis filter bank 101, filters the input spectrum Y(µ,k) according to the estimated (dynamic) suppression filter coefficients $H_{w\_dyn}(\mu,k)$ to provide a clean estimated speech spectrum $\hat{S}_{clean}(\mu,k)$. An output (frequency-to-time) domain transformer, e.g., a synthesis filter bank 107, which is operatively coupled to the noise suppression filter 106, transforms the clean estimated speech spectrum $\hat{S}_{clean}(\mu,k)$ or a corresponding spectrum such as a spectrum $\hat{S}(\mu,k)$ into a time-domain output signal ŝ(n) representative of the noise components of the input signal y(n).

The estimated noise suppression filter coefficients $H_{w\_dyn}(\mu,k)$ may be derived from the input spectrum Y(µ, k) and the smoothed-magnitude input spectrum $\overline{Y}(\mu, k)$ by way of dynamic suppression estimator 108 which is operatively coupled with the analysis filter bank 101 and the smoothing filter 102. The correlation factor $K_{corr}(\mu,k)$ may be derived by way of an interframe formant detector 109 which receives the smoothed-magnitude input spectrum $\overline{Y}(\mu, k)$ from the smoothing filter 102 and a scaling factor $y_{scaling}(k)$ for dynamic noise input scaling from a level estimator and scaling controller 110. The level estimator and scaling controller 110 receives the input spectrum $\overline{Y}(\mu, k)$ from the analysis filter bank 101 and a smoothed-magnitude reference spectrum $\overline{X}(\mu, k)$ from another smoothing filter 112, which is operatively coupled with a reference (time-to-frequency) domain transformer, e.g., an analysis filter bank 111, and which smoothes magnitudes of a reference spectrum X(µ,k) to provide a smoothed-magnitude reference spectrum $\overline{X}(\mu, k)$. The reference spectrum X(µ,k) is determined by the analysis filter bank 111 based on a time-domain reference signal x(n). the reference signal x(n) may be provided by a higher level system that includes or communicates with the system for reducing noise described herein. The correlation factor $K_{corr}(\mu,k)$ may further be used to control a comfort noise adder 113 which may be connected between the noise suppression filter 106 and the synthesis filter bank 107. The comfort noise adder 113 adds comfort noise with a predetermined structure and amplitude to the clean estimated speech spectrum $\hat{S}_{clean}(\mu,k)$ to provide the spectrum $\hat{S}(\mu,k)$ that is input into the synthesis filter bank 107.

The input signal y(n) and the reference signal x(n) may be transformed from the time domain to the frequency (spectral) domain, i.e., into the input spectrum Y(µ,k) and the reference spectrum X(n) by the analysis filter banks 101 and 111 employing an appropriate domain transform algorithm such as, e.g., a short term Fourier transform (STFT). STFT may also be used in the synthesis filter bank 107 to transform the clean estimated speech spectrum $\hat{S}_{clean}(\mu,k)$ or the spectrum $\hat{S}(\mu,k)$ into the time-domain signal output signal ŝ(n). For example, the analysis may be performed in frames by a sliding low-pass filter window and a discrete Fourier transformation (DFT), a frame being defined by the Nyquist period of the bandlimited window. The synthesis may be similar to an overlap add process, and may employ an inverse DFT and a vector add each frame. Spectral modifications may be included if zeros are appended to the window function prior to the analysis, the number of zeros being equal to the time characteristic length of the modification.

In the following examples, a frame k of the noisy input spectrum Y(µ,k)=STFT(y(n)) forms the basis for the further processing. By way of magnitude smoothing, the instantaneous fluctuations are removed but the long-term dynamicity of the noise is retained according to $\overline{Y}(\mu, k)$=Smoothing (Y(µ,k)). The smoothed magnitude of the input spectrum, $\overline{Y}(\mu, k)$, may be used to estimate the magnitude of the (background) noise spectrum. Such an estimation may be performed by a processing scheme that is able to deal with the harsh noise environment present, e.g., in automobiles, and to meet the desire to keep the complexity low for real-time implementations. The scheme may be based on a multiplicative estimator in which multiple increment and decrement time-constants are utilized. The time constants may be chosen based on noise-only and speech-like situations. Further, by observing the long-term "trend" of the noisy input spectrum, suitable time-constants can be chosen, which reduces the tracking delay significantly. The trend factor can be measured while taking into account the dynamics of speech.

For example, the noisy speech signal in the discrete-time domain may be described as y(n)=s(n)+b(n) where n is again the discrete time index, y(n) is the (noisy speech) signal recorded by a microphone, s(n) is the clean speech signal and b(n) is the noise component. The processing of the signals is performed in the subband domain. An STFT based analysis-synthesis filterbank is used to transform the signal into its subbands and back to time-domain. The output of the analysis filterbank is the short-term spectrum of the input signal Y(µ, k) where, again, µ is the subband index and k is the frame index. The estimated background noise $\hat{B}(\mu, k)$ is used by a noise suppression filter such as the Wiener filter to obtain an estimate of the clean speech.

Noise present in the input spectrum can be estimated by accurately tracking the segments of the spectrum in which speech is absent. The behavior of this spectrum is dependent on the environment in which the microphone is placed. In an automobile environment, for example, there are many factors that contribute to the non-stationarity of the noise spectrum. For such environments, the noise spectrum can be described as non-flat with a low-pass characteristic dominating below 500 Hz. Apart from this low-pass characteristic, changes in speed, the opening and closing of windows, passing cars, etc. cause the noise floor to vary with time. A close look at one frequency bin of the noise spectrum reveals the following properties: (a) Instantaneous power can vary from the mean power to a large extent even under steady conditions, and (b) a steady increase or a steady decrease of power is observed in certain situations (e.g. during acceleration). A simple estimator, which can be used to track these magnitude changes for each frequency bin, is described in Equation (1)

$$\hat{B}(\mu, k) = \begin{cases} \hat{B}(\mu, k-1)\Delta_{inc}, & \text{if } \overline{Y}(\mu, k) > \hat{B}(\mu, k-1), \\ \hat{B}(\mu, k-1)\Delta_{dec}, & \text{else.} \end{cases} \quad (1)$$

This estimator follows a smoothed input $\overline{Y}(\mu, k)$ based on the previous noise estimate. The speed at which it tracks the noise floor is controlled by an increment constant $\Delta_{inc}$ and a decrement constant $\Delta_{dec}$. The advantage of this scheme may be due to low computational complexity. Such an estimator can be made to work with careful parametrization of increment and decrement constants combined with a highly smoothed input. According to the observations presented about the noise, such an estimator would struggle with the following drawbacks: low time-constants will lag in tracking the noise power, and high time-constants will estimate speech as noise.

Starting from this simple estimator, a noise estimation scheme may be employed that allows keeping the computational complexity low and offering fast, accurate tracking. The estimator is to choose the "right" multiplicative constant for a given specific situation. Such a situation can be a speech passage, a consistent background noise, increasing background noise, decreasing background noise, etc. A measured value called the "trend" is computed which indicates whether the long-term direction of the input signal is going up or down. The incremental and decremental time-constants along with the trend are applied together in Equation (9).

Tracking of the noise estimator is dependent on the smoothed input signal $Y(\mu,k)$. The input spectrum is smoothed using a first order infinite impulse response (IIR) filter $$\overline{Y}(\mu,k) = \gamma_{smth}|Y(\mu,k)| + (1-\gamma_{smth})\overline{Y}(\mu,k-1), \quad (2)$$

where $\gamma_{smth}$ is a smoothing constant. The smoothing constant is chosen in such a way that it retains fine variations of the input spectrum as well as eliminating the high variation of the instantaneous spectrum. Optionally, additional frequency-domain smoothing can be applied.

One of the difficulties for noise estimators in non-stationary environments is differentiating between a speech part of the spectrum and an actual change in the spectral floor. This problem can be at least partially overcome by measuring the duration of a power increase. If the increase is due to a speech source, then the power will drop down after the utterance of a syllable, whereas if the power continues to stay up for a longer duration then it is an indication of increased background noise. It is these dynamics of the input spectrum that the trend factor measures in the processing scheme. By observing the direction of the trend—going up or down—the spectral floor changes can be tracked while avoiding the tracking of the speech-like parts of the spectrum. The decision as to the current state of the frame is made by comparison to determine whether the estimated noise of the previous frame is smaller than the smoothed input spectrum of the current frame, by which a set of values are obtained. A positive value indicates that the direction is going up, and a negative value indicates that the direction is going down as, for example, $$A_{curr}(\mu, k) = \begin{cases} 1, & \text{if } \overline{Y}(\mu, k) > \hat{B}(\mu, k-1), \\ -4, & \text{else,} \end{cases} \quad (3)$$

where $\hat{B}(\mu, k-1)$ is the estimated noise of the previous frame. The values 1 and −4 are exemplary and any other appropriate value can be assumed. The trend may be smoothed along both the time and the frequency axis. A zero-phase forward-backward filter may be used for smoothing along the frequency axis. Smoothing along the frequency axis ensures that isolated peaks caused by non-speech-like activities are suppressed. Smoothing is applied according to $$\overline{A_{trnd}}(\mu,k) = \gamma_{trnd-fq}A_{curr}(\mu,k) + (1-\gamma_{trnd-fq})\overline{A_{trnd}}(\mu-1,k), \quad (4)$$

for $u=1, \ldots, N_{Sbb}$ and similarly backward smoothing is applied. The time-smoothed trend factor $\overline{A_{trnd}}(\mu, k)$ again is given by an IIR filter $$\overline{\overline{A_{trnd}}}(\mu,k) = \gamma_{trnd-tm}\overline{A_{trnd}}(\mu,k) + (1-\gamma_{trnd-tm})\overline{\overline{A_{trnd}}}(\mu,k-1), \quad (5)$$

where $\gamma_{trnd-tm}$ is a smoothing constant. The behavior of the double-smoothed trend factor $\overline{\overline{A_{trnd}}}(\mu, k)$ can be summarized as follows: The trend factor is a long-term indicator of the power level of the input spectrum. During speech parts the trend factor temporarily goes up but comes down quickly. When the true background noise increases then the trend goes up and stays there until the noise estimate catches up. Similar behavior is seen for a decreasing background noise power. This trend measure is used to further "push" the noise estimate in the desired direction. The trend is compared to an upward threshold and a downward threshold. When either of these thresholds are reached the respective time-constant to be later used is chosen as shown in Equation (6)

$$\Delta_{trend}(\mu, k) = \begin{cases} \Delta_{trend-up}, & \text{if } A_{trnd}(\mu, k) > T_{trnd-up}, \\ \Delta_{trend-down}, & \text{else if } A_{trnd}(\mu, k) > T_{trnd-up}, \\ 1 & \text{else.} \end{cases} \quad (6)$$

Tracking of the noise estimation is performed for two cases. One such case is when the smoothed input is greater than the estimated noise, and the second is when it is smaller. The input spectrum can be greater than the estimated noise due to three reasons: First, when there is speech activity, second when the previous noise estimate has dipped too low and must rise, and third when there is a continuous increase in the true background noise. The first case is addressed by checking whether the level of the input spectrum $Y(\mu,k)$ is greater than a certain signal-to-noise ratio (SNR) threshold $T_{snr}$, in which case the chosen incremental constant $\Delta_{speech}$ has to be very slow because speech should not be tracked. For the second case the incremental constant is set to $\Delta_{noise}$ which means that this is a case of normal rise and fall during tracking. In the case of a continuous increase in the true background noise the estimate must catch up with this increase as fast as possible. For this a counter providing counts $k_{cnt}(\mu,k)$ is utilized. The counter counts the duration during which the input spectrum has stayed above the estimated noise. If the count reaches a threshold $K_{inc-max}$ then a fast incremental constant $\Delta_{inc-fast}$ may be chosen. The counter is incremented by 1 every time the input spectrum $Y(\mu,k)$ is greater than the estimated noise spectrum $\hat{B}(\mu, k-1)$ and reset to 0 otherwise. Equation (7) captures these conditions $$\Delta_{inc}(\mu, k) = \begin{cases} \Delta_{inc-fast}, & \text{if } k_{cnt}(\mu, k) > K_{inc-max}, \\ \Delta_{speech}, & \text{else if } \overline{Y}(\mu, k) > \hat{B}(\mu, k-1)T_{snr}, \\ \Delta_{noise}, & \text{else} \end{cases} \quad (7)$$

The choice of a decremental constant $\Delta_{dec}$ does not have to be as explicit as the in the incrementing case. This is because there is less ambiguity when the input spectrum $Y(\mu,k)$ is lesser than the estimated noise spectrum $\hat{B}(\mu, k-1)$. Here the noise estimator chooses the decremental constant $\Delta_{dec}$ by default. For a subband $\mu$ only one of the above two stated conditions is chosen. From either of the two conditions a final multiplicative constant is determined $$\Delta_{final}(\mu, k) = \begin{cases} \Delta_{inc}(\mu, k), & \text{if } \overline{Y}(\mu, k) > \hat{B}(\mu, k-1). \\ \Delta_{dec}, & \text{else} \end{cases} \quad (8)$$

The input spectrum includes only background noise when no speech-like activity is present. At such times the best estimate is achieved by setting the noise estimate equal to the input spectrum. When the estimated noise is lower than the input spectrum, the noise estimate and the input spectrum are combined with a certain weight. The weights are computed according to Equation (10). A pre-estimate $\hat{B}_{pre}(\mu, k)$ is obtained to compute the weights. The pre-estimate $\hat{B}_{pre}(\mu, k)$ is used in combination with the input spectrum. It is obtained by multiplying the input spectrum with the multiplicative constant $\Delta_{final}(\mu, k)$ and the trend constant $\Delta_{Trend}(\mu,k)$ $$\hat{B}_{pre}(\mu,k) = \Delta_{final}(\mu,k)\Delta_{Trend}(\mu,k)\hat{B}(\mu,k-1). \quad (9)$$

A weighting factor $W_{\hat{B}}(\mu, k)$ for combining the input spectrum $Y(\mu,k)$ and the pre-estimate $\hat{B}_{pre}(\mu, k)$ is given by $$W_{\hat{B}}(\mu, k) = \min\left\{1, \left(\frac{\hat{B}_{pre}(\mu, k)}{\overline{Y}(\mu, k)}\right)^2\right\} \quad (10)$$

The final noise estimate is determined by applying this weighting factor $$\hat{B}(\mu,k) = W_{\hat{B}}(\mu,k)\overline{Y}(\mu,k) + (1 - W_{\hat{B}}(\mu,k))\hat{B}_{pre}(\mu,k). \quad (11)$$

During the first few frames of the noise estimation process, the input spectrum itself is directly chosen as the noise estimate for faster convergence.

The estimated background noise $\hat{B}(\mu, k)$ and the magnitude of the input spectrum $|Y(\mu,k)|$ are combined to compute the noise suppression filter coefficients, $H_w(\mu,k)$, also referred to as the Wiener filter coefficients by, $$H_w(\mu, k) = \max\left(1, \frac{\hat{B}_{pre}(\mu, k)}{\overline{Y}(\mu, k)}\right) \quad (12)$$

The Wiener filter is applied to the complex spectra of the input spectrum to obtain an estimate of the clean speech spectrum $\hat{S}(\mu,k)$, which is $$\hat{S}(\mu,k) = H_w(\mu,k) \cdot Y(\mu,k). \quad (13)$$

The estimated clean speech spectrum $\hat{S}(\mu,k)$ is transformed into the discrete-time domain by the synthesis filter bank to obtain the estimated clean speech signal $\hat{s}(n) = \text{ISTFT}(\hat{S}(\mu,k))$, where ISTFT is the application of the synthesis filter bank, e.g., an inverse short term Fourier transform.

In the above-described exemplary system for reducing noise, at least one of the following additional blocks may additionally be utilized: Dynamic suppression, reference signal masked input level estimation, interframe formant detection, noise suppression filter coefficients determination, and comfort noise addition. For example, a dynamic noise suppression scheme implemented in the dynamic suppression estimator 108. In order to control highly instationary noise, the noisy input signal, i.e., the input spectrum, is suppressed in a time-frequency controlled manner, and the applied suppression is not constant. The amount of suppression to be applied is determined by the "dynamicity" of the noise in the noisy input signal. The output of the dynamic suppression scheme is a set of filter coefficients which determine the amount of suppression to be applied to the so called "dynamic noise" given by, $$H_{dyn}(\mu,k) = \text{DynSupp}(Y(\mu,k),\overline{Y}(\mu,k)). \quad (14)$$

The output of the dynamic suppression estimator 108 is denoted as dynamic suppression filter coefficients $H_{dyn}(\mu,k)$.

A reference signal masked input level estimation is implemented in order to correctly detect "speech formants" with a certain suitable scaling. The reference signal mask prevents incorrect estimation of the scaling level. A corresponding scaling value is estimated based on the level of the noisy input signal $y(n)$, i.e., the input spectrum $Y(\mu,k)$. Keeping in mind that the noisy input signal $y(n)$ could be operating under echo conditions, this scaling is determined by taking into account the reference signal $x(n)$, i.e., reference spectrum, which potentially marks the "true" level of the input signal.

$$y_{scaling}(k) = \text{InputScaling}(Y(\mu,k),\overline{X}(\mu,k)). \quad (15)$$

The output of the level estimator and scaling controller 110 is the time-varying scaling signal denoted by $y_{scaling}(k)$.

Interframe formant detection is performed in the interframe formant detector 109 which detects formants present in the noisy input speech signal $y(n)$. This detection outputs a signal which is a time-varying signal or a time-frequency varying signal. The output $K_{corr}(\mu,k)$ of the interframe formant detector 108 is given by $$K_{corr}(\mu,k) = \text{FormantDetection}(y_{scaling}(k),H_{dyn}(\mu,k)). \quad (16)$$

The output $K_{corr}(\mu,k)$ of the interframe formant detector 108 is a signal which may be a value between 0 and 1, indicating whether formants are present or not. By choosing an adequate threshold, this signal can be utilized to determine which parts of the time-frequency noisy input spectrum are to be suppressed.

Noise suppression filter coefficients are determined in the suppression filter controller 105 based on the Wiener filter coefficients, dynamic suppression coefficients, and the formant detection signal and supplied as final noise suppression filter coefficients to the noise suppression filter 106. The three components mentioned above are combined to obtain the final suppression filter coefficients $H_{w\_dyn}(\mu,k)$ which are given by $$H_{w\_dyn}(\mu,k) = \text{FinalSuppCoeffs}(K_{corr}(\mu,k),H_{dyn}(\mu,k),H_w(\mu,k)). \quad (17)$$

Figure 2:
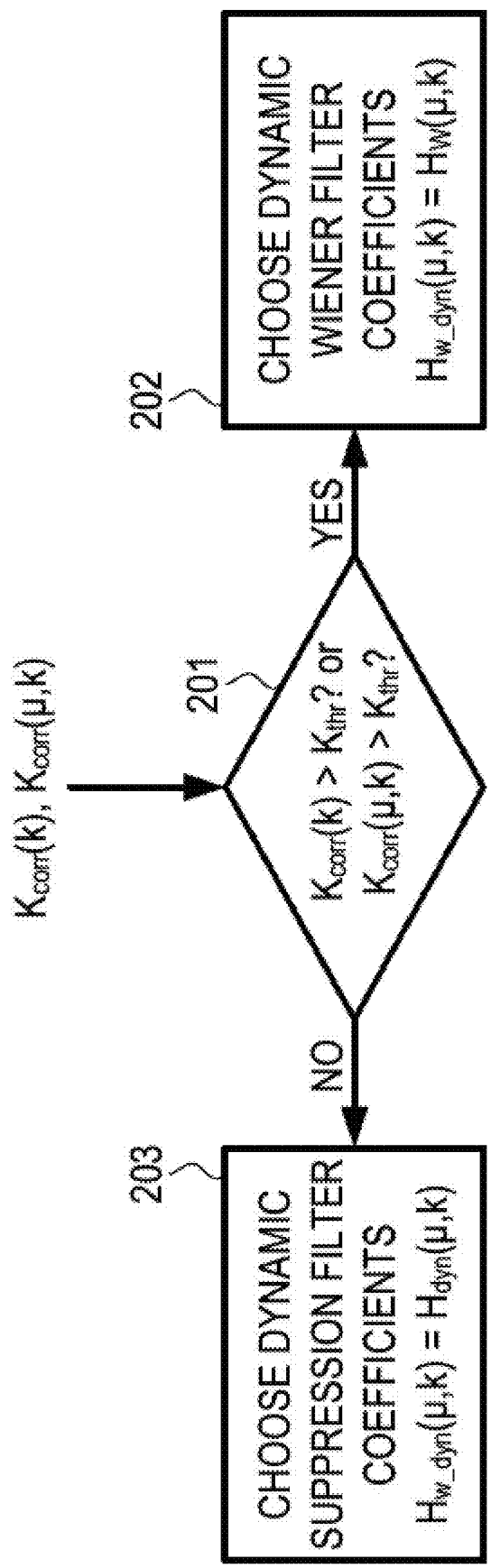
FIG. 2 is a schematic diagram illustrating an exemplary decision logic for combining/switching final noise suppression filter coefficients in the system shown in FIG. 1 according to one or more embodiments.

A flowchart shown in FIG. 2 depicts a decision logic for combining/switching between the Wiener filter coefficients and the dynamic suppression filter coefficients. The decision logic is supplied with at least one of the formant detection signal $K_{corr}(\mu,k)$ and a corresponding signal $K_{corr}(k)$, which is the formant detection signal independent from the sub-band (subband index $\mu$), and compares at least one of the formant detection signal $K_{corr}(\mu,k)$ and the corresponding signal $K_{corr}(k)$ to a threshold $K_{thr}$ (procedure 201). If at least one of the formant detection signal $K_{corr}(\mu,k)$ and the corresponding signal $K_{corr}(k)$ are greater than a threshold $K_{thr}$, the dynamic wiener filter coefficients $H_w(\mu,k)$ are used as final suppression filter coefficients $H_{w\_dyn}(\mu,k)$ (procedure 202). Otherwise, the dynamic suppression filter coefficients $H_{dyn}(\mu,k)$ are used as final suppression filter coefficients $H_{w\_dyn}(\mu,k)$ (procedure 203). After obtaining the final noise suppression filter coefficients $H_{w\_dyn}(\mu,k)$, the clean speech estimate $\hat{S}_{clean}(\mu,k)$ is obtained according to $$\hat{S}_{clean}(\mu,k)=H_{w\_dyn}(\mu,k)\cdot Y(\mu,k). \tag{18}$$

In the comfort noise adder 113, comfort noise is added, controlled through the formant detection signal $K_{corr}(\mu,k)$. A constant, level-independent noise signal $N_{comfort}(\mu,k)$ is added to the estimated clean speech spectrum to obtain the final estimate of the clean speech given by $$\hat{S}(\mu,k)=\hat{S}_{clean}(\mu,k)+N_{comfort}(\mu,k). \tag{19}$$

As in a NR system without comfort noise addition, the estimated clean speech $\hat{S}(\mu,k)$ (including the comfort noise) is transformed into discrete-time domain to obtain the estimated clean speech signal $\hat{s}(n)$.

Figure 3:
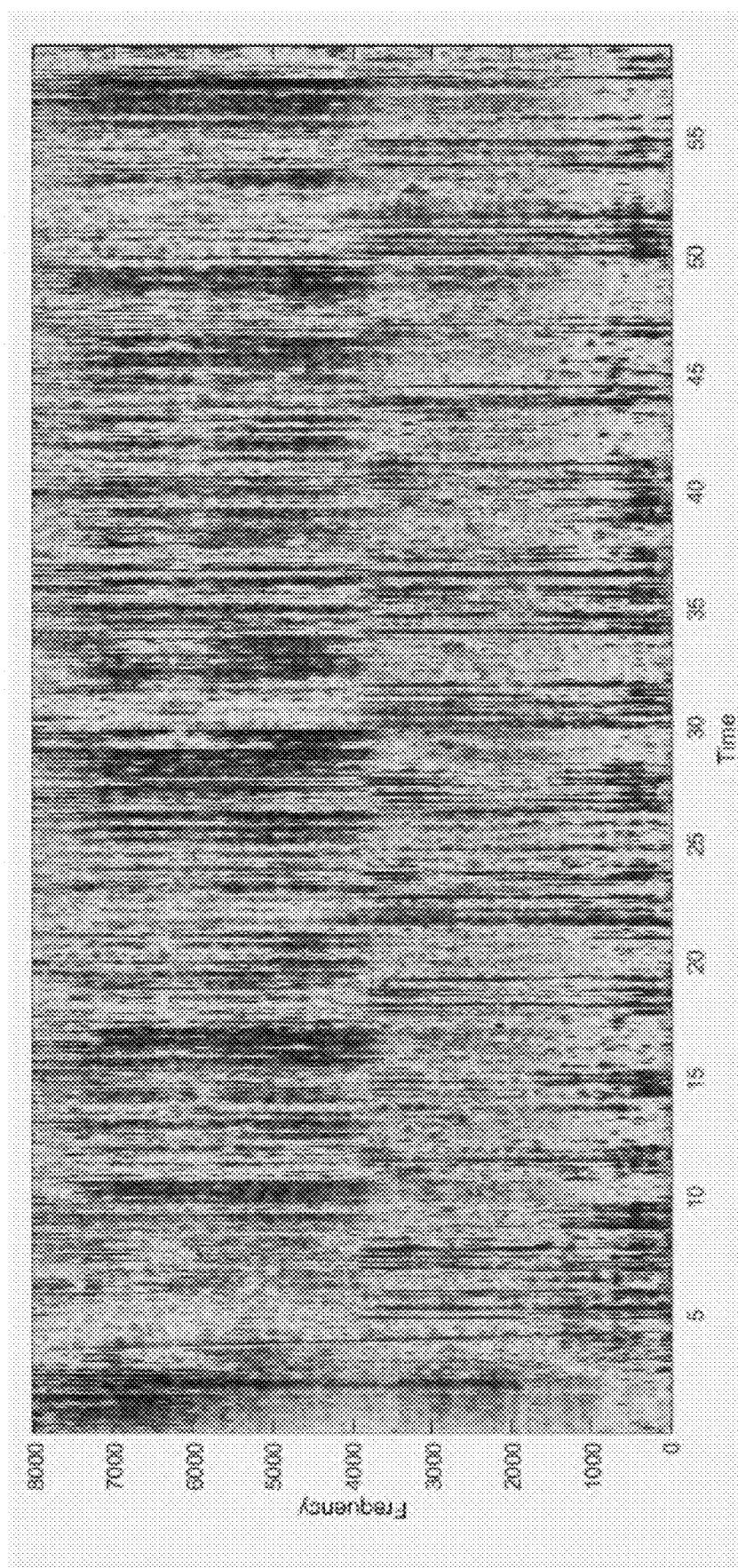
FIG. 3 is a frequency-time diagram illustrating an exemplary spectrogram of signals processed using a basic noise reduction system according to one or more embodiments.
Figure 4:
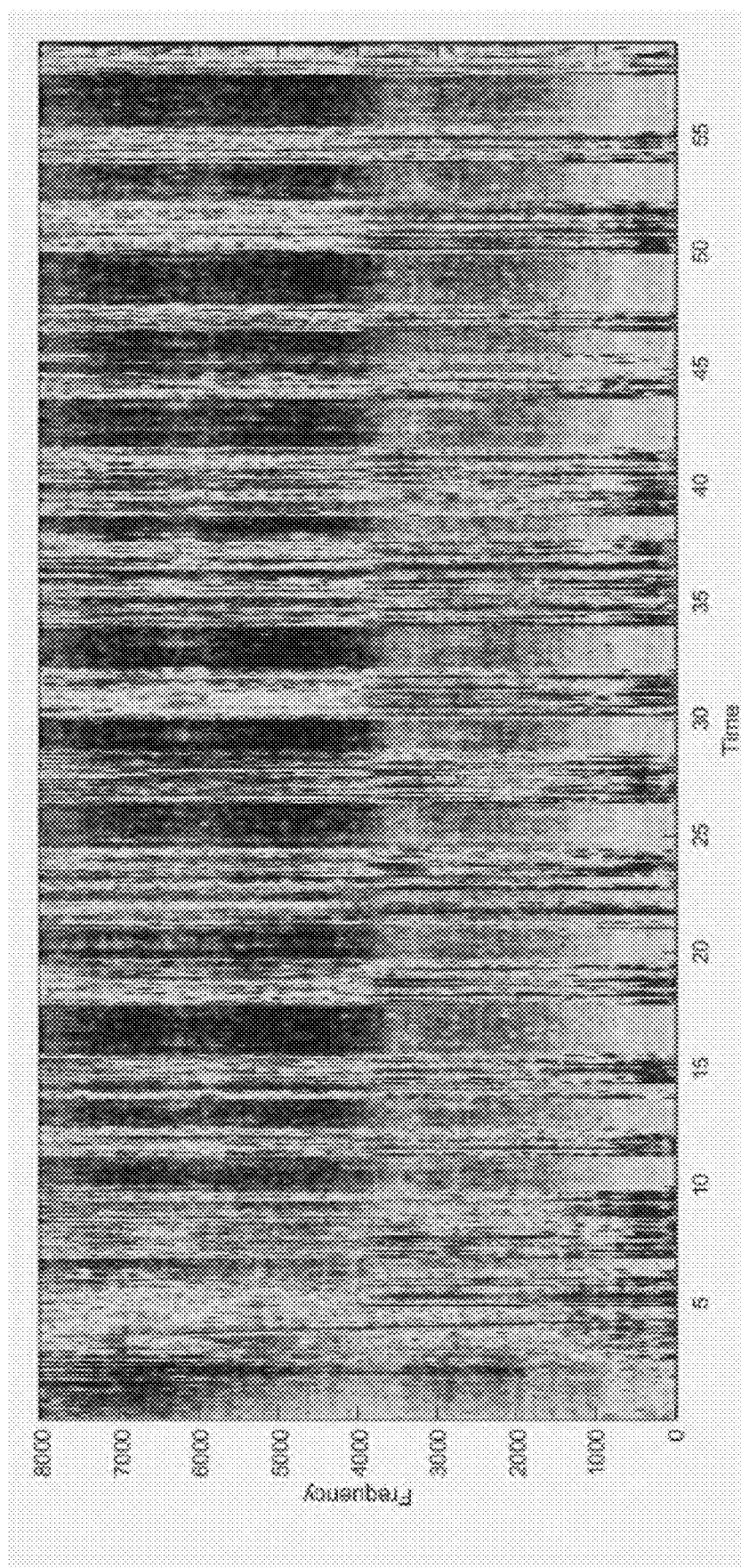
FIG. 4 is a frequency-time diagram illustrating an exemplary spectrogram of signals processed using an enhanced noise reduction system according to one or more embodiments.
Figure 5:
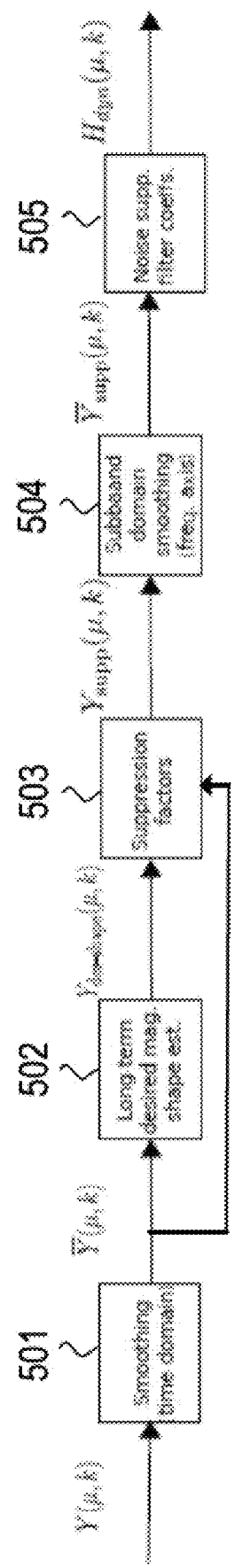
FIG. 5 is a block diagram illustrating an exemplary dynamic noise suppression system according to one or more embodiments.

The frequency-time diagrams shown in FIG. 4 and FIG. 5 illustrate the output exemplary spectrograms of the signals processed using the basic NR system and the modified NR system. As it can be seen from FIGS. 3 and 4, the additional blocks completely remove instationary noise components between speech segments as seen along the time axis between 10 and 11 seconds, 12 and 15 seconds, 24.5 and 27 seconds, etc.

With the exemplary NR system described above in connection with FIG. 1 it is possible to reduce both stationary and instationary background noise components in an effective single structure implementation. By utilizing the reference signal for echo situations, the NR system eliminates misdetections and incorrect suppressions of desired speech segments. The NR structure allows the handling of various kinds of noisy input signals with different SNR and speech levels. Instationary noise, irrespective of what kind, is suppressed with almost no impact on the true speech components. As a consequence, by means of the proposed NR structure it is possible to place, e.g., communication/speech recognition devices, such as smart loudspeakers, used for a wide range of applications in different rooms and situations such as living rooms, office spaces, noisy party halls, and car interiors, etc. When such an NR system is implemented in such a device, the performance of the device improves significantly. It is to be noted that the processing schemes and structures for the different blocks described above in connection with FIG. 1 could vary. The output obtained here is for one such implementation.

A Wiener type noise suppression filter improves the SNR of a noisy input signal. This improvement in SNR is desirable for frames containing speech. For frames that contain only background noise, sometimes a Wiener type noise suppression filter is either not desirable or does not suppress the noise sufficiently. Such problems are practically faced in real-world situations where the communication device may be placed practically anywhere and everywhere. This results in highly non-stationary noise which cannot be tracked by noise power spectral density (PSD) estimators. This is annoying to the listener and can cause listener fatigue.

Noise shaping can be anything from having a fixed noise shape to a fixed filtering of the residual noise. In the context of a noise reduction system or method, noise magnitude shaping may allow controlling highly dynamic fluctuations and variations of a noisy input spectrum is, which can be achieved by predefining a desired noise shape. For example, a suitable filter may be computed so that the output of the noise magnitude shaping is equal to the desired noise shape.

To dynamically suppress noise in the system shown in FIG. 1, or in any other application including standalone applications, the magnitude shape of the desired residual noise may be determined. For example, the desired noise magnitude shape may be estimated based on either the input magnitude spectrum or its smoothed version. Because the noisy input spectrum is highly dynamic, a predefined and fixed shape would result in residual noise that is experienced as extremely "static" by a listener. In order to make the residual noise sound more natural and pleasant to the listener, the desired noise shape of the residual noise may be estimated and "extracted" from the noisy input spectrum by way of a long-term estimate of the noisy input magnitude. This long-term estimate may be obtained according to equations (20) and (21):

$$\Delta_{des-shape}^{delta}(\mu,k)=\frac{Y_{des-shape}(\mu,k-1)}{\overline{Y}(\mu,k)}, \text{ wherein} \tag{20}$$

$$Y_{des-shape}(\mu,k)= \tag{21}$$

$$\begin{cases} Y_{des-shape}(\mu,k-1)\Delta_{des-shape}^{delta}(\mu,k), & \text{if } \frac{Y_{des-shape}(\mu,k-1)}{\overline{Y}(\mu,k)}>1.5 \\ Y_{des-shape}(\mu,k-1)\Delta_{des-shape}^{delta}(\mu,k), & \text{if } \frac{Y_{des-shape}(\mu,k-1)}{\overline{Y}(\mu,k)}<0.5 \\ Y_{des-shape}(\mu,k-1), & \text{else} \end{cases}$$

The desired noise magnitude shape is denoted by $Y_{des-shape}(\mu,k)$ and is obtained by multiplying the previous estimate of the noise magnitude shape with a parameter $\Delta_{des-shape}^{delta}$, which is dynamically determined (e.g., calculated) as indicated in equation (20) but may alternatively be a fixed but tunable incremental or decremental constant, depending on a ratio sign and level. The ratio of the current frame to the desired magnitude may be determined by way of a threshold set at 1.5 and 0.5 which can be changed or tuned. The noise suppression scheme may also provide for a "hold time" through which the desired shape is not updated.

The noise suppression scheme may also provide for individual "hold times". A "hold time" may be introduced to further support the characteristic of a long-term estimation of the desired magnitude shape determination. Thereby, the "hold time" may be coupled with a threshold value in order to extend its existing hysteresis behavior. Thus, whenever the threshold, which may be applied with an individual "hold time", is passed, a new function rule may be delayed by the "hold time", which effects and holds a previous function rule until the hold time has expired. Additionally, the "hold time" may be specified to certain threshold passing directions to allow for different "hold times" for each threshold and its different passing direction.

Having determined the desired magnitude shape, "suppression factors" are then determined. A suppression factor is an amount of attenuation or amplification that allows to achieve the desired magnitude shape $Y_{des-shape}(\mu, k)$ according to Equation (21). Another possibility is to utilize the already existing background noise estimation as a desired shape, but this may be counterproductive since background noise estimation is usually tuned to follow the "true" background noise as fast as possible. This fast variation can result in unpleasant artifacts experienced by the listener. The suppression factors $Y_{supp}(\mu,k)$ can be determined according to $$Y_{supp}(\mu, k) = \frac{\Lambda_{des-shape}^{o-est} \cdot Y_{des-shape}(\mu, k)}{\overline{Y}(\mu, k)}. \quad (22)$$

An over-estimation factor $\Lambda_{des-shape}^{o-est}$ (level control for suppression factors) may be used to slightly adjust the overall level of the desired shape. This may be similar to the overestimation factor used in Wiener Filter type noise suppression. Finally to avoid numerical errors, the denominator may be protected by performing a maximum operation with a small value $\varepsilon$ (numerical protection value against division by zero) which results in $$Y_{supp}(\mu, k) = \frac{\Lambda_{des-shape}^{o-est} \cdot Y_{des-shape}(\mu, k)}{\max(\overline{Y}(\mu, k), \varepsilon)} \quad (23)$$

The desired suppression may be a separately configurable parameter. The suppression factors may be first smoothed along the frequency axis (sub-band domain) with a zero-phase infinite impulse response (IIR) filter according to $$\overline{Y}_{supp}(\mu,k) = a_{\overline{Y}} Y_{supp}(\mu,k) + (1-a_{\overline{Y}})\overline{Y}_{supp}(\mu-1,k) \quad (24)$$

in which $a_{\overline{Y}}$ is the smoothing constant (frequency axis smoothing) and $\overline{Y}_{supp}(\mu, k)$ is the smoothed suppression factors. With the suppression factors available, the final "dynamic" noise suppression filter are determined by simply shifting the determined suppression factors by the amount of desired suppression given by $$\hat{H}_{dyn}(\mu,k) = \Lambda_{dyn-supp}^{o-est} \cdot \overline{Y}_{supp}(\mu,k), \quad (25)$$

in which the smoothed suppression factors may be supplemented again with a control parameter, e.g., control parameter $\Lambda_{dyn-supp}^{o-est}$ (level control for desired magnitude). This parameter may be tuned to a factor of $H_{floor}$ in order to be able to relate to the amount of suppression applied in dynamic suppression. In order to control the undesirable musical tones, the suppression filter may be limited to a maximum and a minimum value given by $$H_{dyn}(\mu,k) = \max(\min(\hat{H}_{dyn}(\mu,k), H_{dyn}^{min}), H_{dyn}^{max}), \quad (26)$$

in which a minimum value $H_{dyn}^{min}$ and a maximum value $H_{dyn}^{max}$ for the suppression filter are adjusted during the tuning process.

The dynamic noise suppression algorithm has five parameters that are tuned, at least. These parameters influence the way the algorithm behaves in different situations. In Equation (21) the desired magnitude is determined based on the ratio between the previous desired magnitude and the current smoothed input spectrum. This may be modified to replace the dynamically determined parameter $\Lambda_{des-shape}^{delta}$ as indicated in Equation (20), by fixed constants when the ratio is, e.g., greater than 1.5 or less than 0.5. These fixed tracking constants may be set, for example, to 1 dB/s for the increment part and –6 dB/s for the decrement part, depending on ratio sign and level. Another tuning parameter is the frequency axis smoothing of the computed suppression factors $a_{\overline{Y}}$.

The smoothing parameter may be tuned in such a way that the transition from one frame to the other is smooth for a far-end listener. The loudness of the suppressed signal can be controlled effectively by the two over-estimation parameters $\Lambda_{dyn-supp}^{o-est}$ and $\Lambda_{des-shape}^{o-est}$, in which the one used in Equation (23) controls the broadband level of the desired magnitude and the one used in Equation (26) controls the broadband level of the suppression factors. For practical tuning purposes, the parameter $\Lambda_{des-shape}^{o-est}$ may be chosen to be a factor of a Wiener filter floor $H_{floor}$. Finally, the two parameters which control the maximum and the minimum suppression applied by the dynamic noise suppression filter may be controlled by a minimum value $H_{dyn}^{min}$ and maximum value $H_{dyn}^{max}$. When the dynamic noise suppression filter is applied, on certain occasions musical noise artifacts may be audible. Although these artifacts are hardly audible, this issue may be addressed by tuning the minimum and the maximum suppression parameters.

A basic structure of an exemplary dynamic noise suppression scheme is shown in FIG. 5. A noisy magnitude input spectrum $Y(\mu, k)$ is smoothed in the time domain in a smoothing block 501 to provide a smoothed magnitude input spectrum $\overline{Y}(\mu, k)$. From the smoothed magnitude noisy input spectrum $\overline{Y}(\mu, k)$, the desired noise shape $Y_{des-shape}(\mu, k)$ is determined in a long-term desired-magnitude-shape estimation block 502 which is operatively coupled to the smoothing block 501. In a suppression factor determination block 503, which is operatively coupled to long-term desired-magnitude-shape estimation block 502, the suppression factors $Y_{supp}(\mu, k)$ are determined. The set of suppression factors $\overline{Y}_{supp}(\mu, k)$ is determined in a sub-band domain smoothing block 504, which is operatively coupled to the suppression factor determination block 503, based on the suppression factors $Y_{supp}(\mu, k)$, which means based on the desired noise shape $Y_{des-shape}(\mu, k)$ and the smoothed magnitude noisy input spectrum $\overline{Y}(\mu, k)$. The final noise suppression filters $H_{dyn}(\mu, k)$ (i.e., their coefficients) are determined in a filter coefficient determination block 505.

Figure 6:
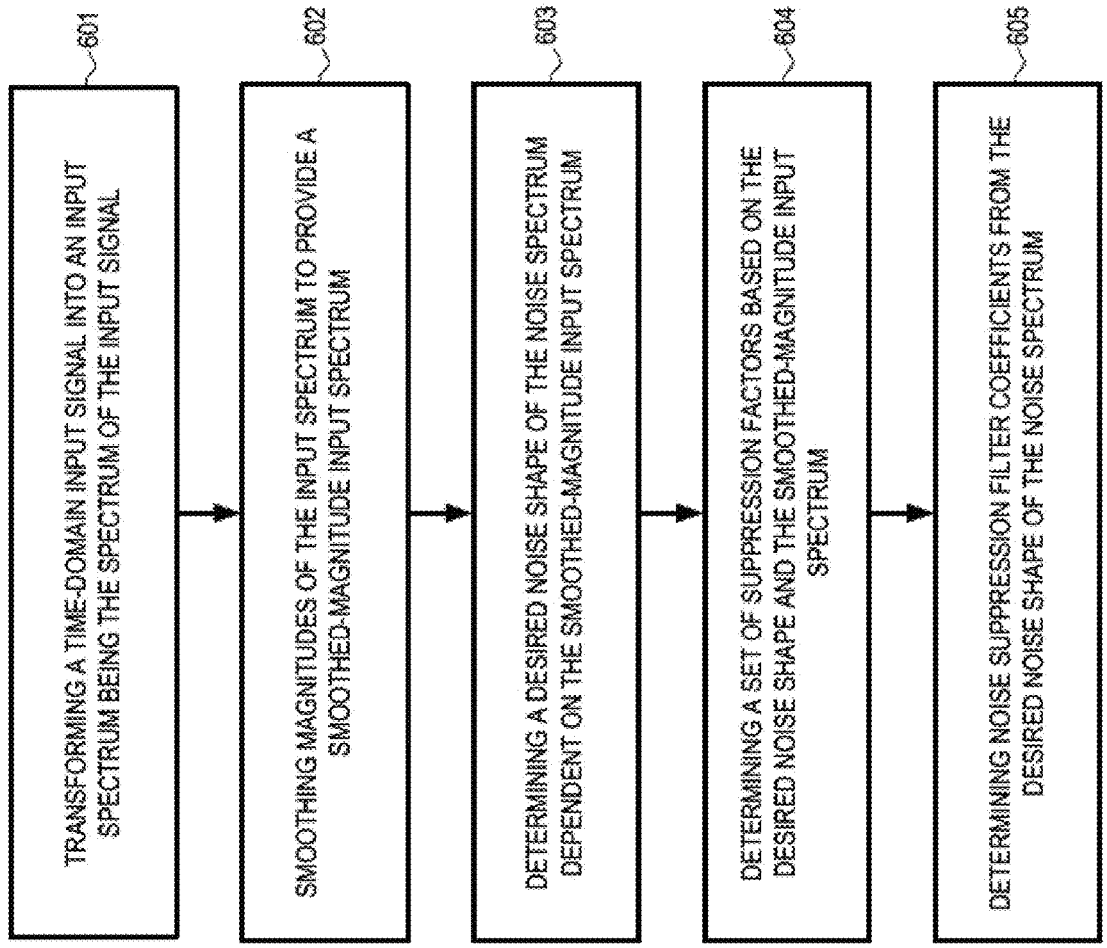
FIG. 6 is a flow chart illustrating an exemplary dynamic noise suppression method according to one or more embodiments.

An exemplary noise reduction method is depicted in FIG. 6 and includes transforming a time-domain input signal into an input spectrum that is the spectrum of the input signal (procedure 601). The input signal includes speech components and noise components, and the input spectrum includes a speech spectrum that is the spectrum of the speech components and a noise spectrum that is the spectrum of the noise components. The method further includes smoothing magnitudes of the input spectrum to provide a smoothed-magnitude input spectrum (procedure 602), determining a desired noise shape of the noise spectrum dependent on the smoothed-magnitude input spectrum (procedure 603), determining a set of suppression factors based on the desired noise shape and the smoothed-magnitude input spectrum (procedure 604), and determining noise suppression filter coefficients from the desired noise shape of the noise spectrum (procedure 605).

The systems and methods described herein allow dynamic noise suppression based on the determination of a desired noise shape of the noise spectrum dependent on the smoothed-magnitude input spectrum as set forth in equation (21). Further, the systems and methods described herein allow not only low frequency applications in harsh noise conditions, but also fully broadband applications in all environments. These systems and methods are able to protect speech from being suppressed.

Figure 7:
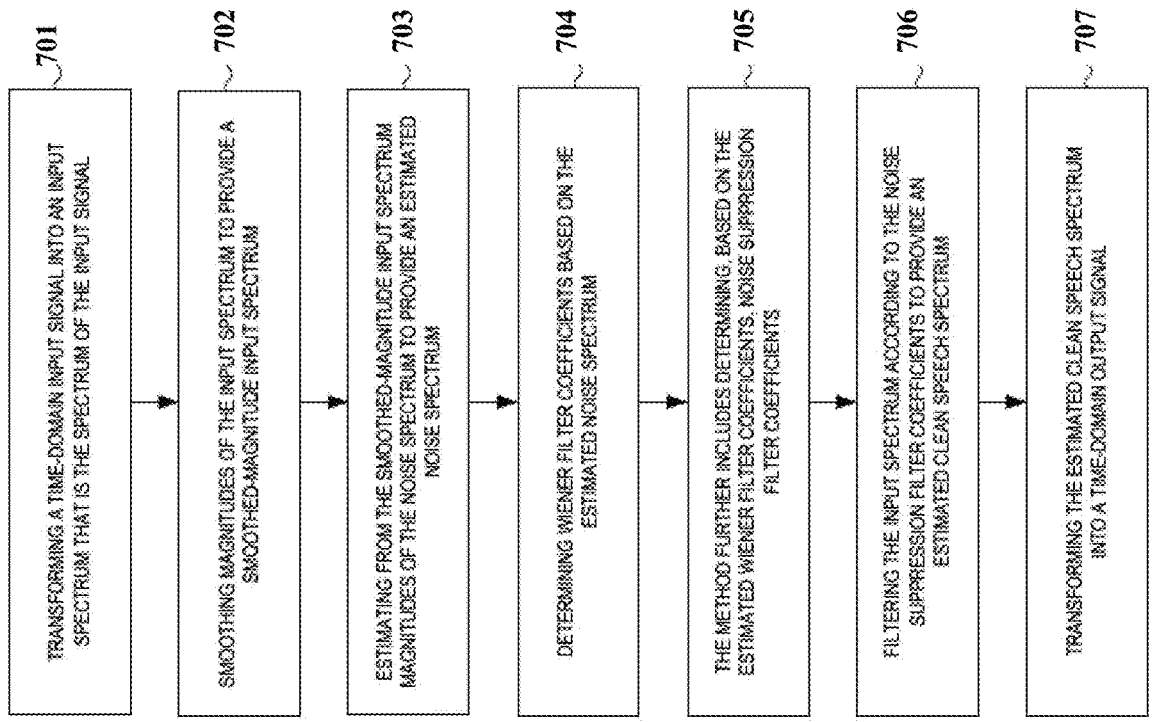
FIG. 7 is a flow chart illustrating an exemplary noise reduction method according to one or more embodiments.

An exemplary noise reduction method is depicted in FIG. 7 and includes transforming a time-domain input signal into an input spectrum that is the spectrum of the input signal (procedure 701), the input signal including speech components and noise components, and the input spectrum including a speech spectrum that is the spectrum of the speech components and a noise spectrum that is the spectrum of the noise components. The method further includes smoothing magnitudes of the input spectrum to provide a smoothed-magnitude input spectrum (procedure 702), estimating from the smoothed-magnitude input spectrum magnitudes of the noise spectrum to provide an estimated noise spectrum (procedure 703), and determining Wiener filter coefficients based on the estimated noise spectrum (procedure 704). The method further includes determining, based on the estimated Wiener filter coefficients, noise suppression filter coefficients (procedure 705), filtering the input spectrum according to the noise suppression filter coefficients to provide an estimated clean speech spectrum (procedure 706), and transforming the estimated clean speech spectrum into a time-domain output signal (procedure 707), the output signal being representative of the noise components of the input signal.

The system described above employs interframe formant detection which is applicable not only in systems as described, but also in any other suitable application including stand-alone (interframe) formant detection systems and methods. Speech signals contain different articulations such as vowels, fricatives, nasals, etc. These articulations and other speech properties, such as short-term power, can be exploited to assist speech enhancement in systems such as noise reduction systems. A detector referred to as the voice activity detector (VAD) is commonly used in such systems. The role of the VAD is to generate a detection signal which, when binary, outputs 1 or 0, indicative of the presence or absence of speech. When the output of the signal is between 0 and 1, a so-called "soft" decision may alternatively be taken which can indicate a certain measure or a certain probability for the presence of the speech in the signal. The VAD signal may be applied in different parts of the speech enhancement system such as echo cancellers, beamforming, noise estimation, noise reduction, etc.

One way to identify a formant in speech is the presence of a harmonic structure in a speech segment. This harmonic structure has a fundamental frequency, referred to as the first formant, and its harmonics. Due to the anatomical structure of human speech generation, harmonics are inevitably present in most human speech articulations. If the formants of a speech are correctly detected, this can identify a major part of speech present in recorded signals. Although this does not cover cases such as fricatives, this can be used for voice detection and, thus, replace a common VAD or operate in tandem with a common VAD.

As used herein a formant can relate to acoustic resonance of the human vocal tract including a resonance and spectral maximum that the resonance produces. According to a definition of a formant, a formant in speech can be detected by searching for peaks which are periodically present in the spectral content of the speech segment. Although this can be implemented easily, it is not computationally attractive to perform search operations on every spectral frame. An easier way to determine (compute) a detection signal indicative of the formants is to perform a normalized spectral (auto) correlation given by $$K_{CSN} = \frac{\sum_{\mu=0}^{N_{Sbb}} \overline{Y}(\mu, k) \cdot \overline{Y}(\mu, k)}{N_{Sbb} + 1}, \quad (27)$$

in which $K_{CSN}$ is a correlation factor and $\overline{Y}(\mu, k)$ is the smoothed magnitude noisy input spectrum. Here, "normalize" means that the spectral correlation is divided by the total number of subbands $N_{Sbb}$ and does not mean that the input spectral is normalized. With the detection signal, represented by the normalized spectral correlation factor $K_{CSN}$ according to Equation (27), along with a comparison with a threshold parameter $K_{thr}$ can be classified as formant speech segments or non-formant speech segments.

To make the detection more robust against background noise, optionally the normalized correlation may be bandlimited in the subband domain to a frequency band defined by a lower subband $\mu_{min}$ (i.e., a lower frequency) and an upper subband $\mu_{max}$ (i.e., an upper frequency). For example, the lower frequency may be set to approximately 100 Hz and the upper frequency to approximately 3000 Hz. This limitation allows for (a) an early detection of formants in the beginning of syllables, (b) a higher spectral SNR (SNR per band) in the chosen frequency range, which increases detection likelihood, and (c) robust in a wide range of noisy environments. The bandlimited spectral normalized spectral correlation factor $K_{CSNB}$ is computed by $$K_{CSNB} = \frac{\sum_{\mu=\mu_{min}}^{\mu_{max}} \overline{Y}(\mu, k) \cdot \overline{Y}(\mu, k)}{(\mu_{max} - \mu_{min}) + 1}. \quad (28)$$

In connection with Equation (27), it is mentioned that the input spectrum is not normalized. One reason for this is because, as with speech signals, it could occur that noise signals also have a harmonic structure. When the noisy input spectrum is normalized in practical situations, it is difficult to adjust the detection threshold $K_{thr}$ for accurate detection of speech formants as compared to harmonics which could be present in the background noise. Also due to the known Lombard effect, the speaker makes an instinctive effort to speak louder than the background noise. Keeping these factors in mind, instead of directly using the primary detection described above in connection with Equation (27) or the bandlimited detection described above in connection with Equation (28), a scaling factor y_scaling(k) is introduced into the detection signal according to $$\overline{Y}_{scaled}(\mu, k) = y_{scaling(k)} \cdot \overline{Y}(\mu, k), \text{ and} \quad (29)$$

$$K_{corr}(k) = \frac{\sum_{\mu=\mu_{min}}^{\mu_{max}} \overline{Y}_{scaled}(\mu, k) \cdot \overline{Y}_{scaled}(\mu, k)}{(\mu_{max} - \mu_{min}) + 1}. \quad (30)$$

The scaling factor y_scaling(k) is multiplied with the smoothed magnitude of the input spectrum to provide a scaled (smoothed) input spectrum $\overline{Y}_{scaled}(\mu, k)$. This scaled input spectrum $\overline{Y}_{scaled}(\mu, k)$ is then used to determine a detection signal which is denoted $K_{corr}(k)$ and defined in Equation (30). The scaling factor y_scaling(k) is a time-varying factor which is controlled based on the level of the input signal y(n), e.g., the level of a near-end speech signal, contained in the input signal y(n). The detection signal $K_{corr}(k)$ is an auto-correlation signal dependent on the level of the input spectrum $\overline{Y}(\mu, k)$, i.e., it is sensitive to the loudness or volume of the input signal y(n). A drawback is that the threshold $K_{thr}$ for the detection is tunable only for a given loudness (or a region of loudness). This can be overcome by making the tuning threshold dependent on the loudness level. Another option (which is described in detail herein) is to scale the input spectrum (or its smoothed magnitude) accordingly while the tuning parameter is tuned for a given "normal loudness" scenario.

Empirical tests have shown that, for a given loudness, a single threshold can effectively handle the dynamicity of speech for formant detection. From simulations and tests in real world scenarios it has been concluded that the scaling factor y_scaling(k) has to be tuned to maintain the same detection statistics only when the loudness changes by a certain level difference. The scaling factor y_scaling(k) may hence be a one-to-one mapping function, which is simpler than a closed-form formula or equation. For example, input signal levels $\overline{Y}_{lev}(k)$ or ranges thereof may be mapped into corresponding scaling factors y_scaling(k) such as mapping a range between level 1 and level 2 to a scaling factor scaling1, a range between level 2 and level 3 to a scaling factor scaling2, and a range between level N−1 and level N to a scaling factor scalingN.

Since the detection signal is sensitive to the level of the input signal y(n), it is important that the level be correctly estimated. The level of the input signal y(n) may be estimated in a very simple way by computing a long-term average of the input signal y(n), irrespective of whether the input signal y(n) contains speech or not. This has the drawback that nonstationary noise, which can vary a lot in a short period of time, can lead to incorrect estimates. Also, since the level estimate and, in effect, the scaling factor y_scaling(k) is used to detect speech formants, the estimate is more robust if it is determined when there is speech-like activity on the input signal y(n). The level is determined as a long-term average of the instantaneous level estimate measured for a fixed time-window of L frames. The instantaneous level can be estimated according to $$Y_{inst}(k) = \begin{cases} Y_{inst}(k) + \overline{Y}(\mu, k), & \text{if } \overline{Y}(\mu, k) > \hat{B}(\mu, k) \cdot T_{lev-SNR} \\ k_\mu = 1, \\ Y_{inst}(k), & \text{else} \\ k_\mu = 0 \end{cases}, \quad (31)$$

in which $Y_{inst}(k)$ is the instantaneous level. Equation (31) is evaluated for every subband μ, wherein the total number of subbands that satisfy the condition of speech-like activity is given by a bin count $k_\mu$. This count and the instantaneous level must be reset to 0 before the level is estimated. The normalized instantaneous level estimate $\overline{Y}_{inst}(k)$ is then obtained by $$\overline{Y}_{inst}(k) = \frac{Y_{inst}(k)}{\sum_{\mu=0}^{N_{Sbb}} k\mu}. \quad (32)$$

Finally, the long-term average of the level is obtained by two kinds of smoothing (a) time-window averaging over L frames and (b) infinite impulse response (IIR) filter based smoothing of the time-window average.

Instead of a two stage filtering, a smoothing filter based on an IIR filter that is longer and has more tuning coefficients may also be used. However, the two stage filtering or smoothing achieves the same smoothing results, with reduced complexity, as e.g., window averaging over L frames. IIR filtering allows reduced complexity but is less precise. Window averaging is more precise but requires a higher complexity. The time-window average is obtained by simply storing L previous values of the instantaneous estimate and determining the average by $$Y_{time-window}(k) = \frac{\sum_{i=0}^{L} \overline{Y}_{inst}(k-i)}{L}. \quad (33)$$

Because of the fact that the scaling value does not need to react to the dynamics of the varying level estimates, an additional IIR based smoothing may be applied to the time-window estimate given by $$\overline{Y}_{lev}(k) = \alpha_{lev}(k) \cdot Y_{time-window}(k) + (1 - \alpha_{lev}) \cdot Y_{time-window}(k), \quad (34)$$

in which $\overline{Y}_{lev}(k)$ is the final level estimate of the smoothed input spectrum $\overline{Y}(\mu, k)$. This level estimate is then passed through the one-to-one mapping function (or a continuous function) described further above to obtain the corresponding scaling factor y_scaling(k).

The noisy input spectrum $\overline{Y}(\mu, k)$ obtained from the input signal y(n) is affected by background noise and is processed, for level estimation, in a similar manner as explained above in connection with Equation (31). For example, if the input signal y(n) is provided by a microphone that is used in a hands-free setup, then it could be affected by signals from an adjacent loudspeaker in the form of (residual) echoes. This could lead to incorrect level estimates since the level of the residual echo and the level of the near-end speaker (close to the microphone) are not necessarily the same. In-order to address this situation and improve the robustness of the level estimation process, the smoothed input spectrum $\overline{Y}(\mu, k)$ may be masked with a reference spectrum before its level is estimated. Masking can be achieved by modifying Equation (31) in that the smoothed magnitude of the input spectrum is multiplied with a reference mask given by $$Y_{inst}(k) = \quad (35)$$

$$\begin{cases} Y_{inst}(k) + \overline{Y}(\mu, k), & \text{if } \overline{X}_{mask}(\mu, k)\overline{Y}(\mu, k) > \hat{B}(\mu, k) \cdot T_{lev-SNR} \\ k_\mu = 1, \\ Y_{inst}(k), & \text{else} \\ k_\mu = 0 \end{cases},$$

The reference mask is herein denoted by $X_{mask}(\mu, k)$. The reference mask $X_{mask}(\mu, k)$ may be a binary mask (or a continuous mask) which indicates the activity per subband μ in the reference spectrum X(μ,k). This can be determined by evaluating whether the magnitude of the smoothed reference spectrum $\overline{X}(\mu, k)$ crosses a certain threshold beyond the estimated background power spectral density (PSD) of the smoothed reference spectrum $\overline{X}(\mu, k)$. The smoothing may be determined according to $$X(\mu,k) = \alpha_x \cdot X_{mag}(\mu,k) + (1 - \alpha_{lev}) \cdot \overline{X}(\mu, k-1), \quad (36)$$

in which $\alpha_x$ is a smoothing constant and $X_{mag}(\mu, k)$ is $$X_{mag}(\mu,k)=|\Re\{X(\mu,k)\}|+|\Im\{X(\mu,k)\}|. \quad (37)$$

The reference mask $\overline{X}_{mask}(\mu, k)$ is determined according to $$\overline{X}_{mask}(\mu, k) = \begin{cases} 1, & \text{if } \overline{X}_{mask}(\mu, k) > \hat{B}_x(\mu, k) \cdot T_{mask}, \\ 0, & \text{else} \end{cases} \quad (38)$$

The reference mask $\overline{X}_{mask}(\mu, k)$ is set to 1 if the smoothed reference spectrum exceeds a mask threshold $T_{mask}$ that is multiplied with the estimated background noise PSD $\hat{B}_x(\mu, k)$ of the reference signal $x(n)$, i.e., the reference spectrum $X(\mu, k)$. Using a reference mask is one way to protect the level estimate. Furthermore, the reference mask $\overline{X}_{mask}(\mu, k)$ may be combined or replaced with an SNR based mask. Optionally, the reference mask $\overline{X}_{mask}(\mu, k)$ may be smoothed with a smoothing constant corresponding to a room's reverberation time.

The formants in speech signals can be used as a speech presence detector which, when supported with other VAD algorithms, can be utilized in noise reduction systems. Here a method for detecting formants in noisy speech frames has been presented. The decision of the detector is a soft-decision output. Although the primary method for detection is very simple, it has been specifically enhanced by three robustness features: (1) bandlimited computation of the formant detector; (2) scaling through speech level estimation for varying speech levels of input signal; and (3) reference signal masked scaling (or level estimation) for protection against echolike scenarios. The algorithms have been implemented and tested in a real-time framework. In the presented noise processing structure the output of the interframe formant detection block is the detection signal $K_{corr}(k)$.

Figure 8:
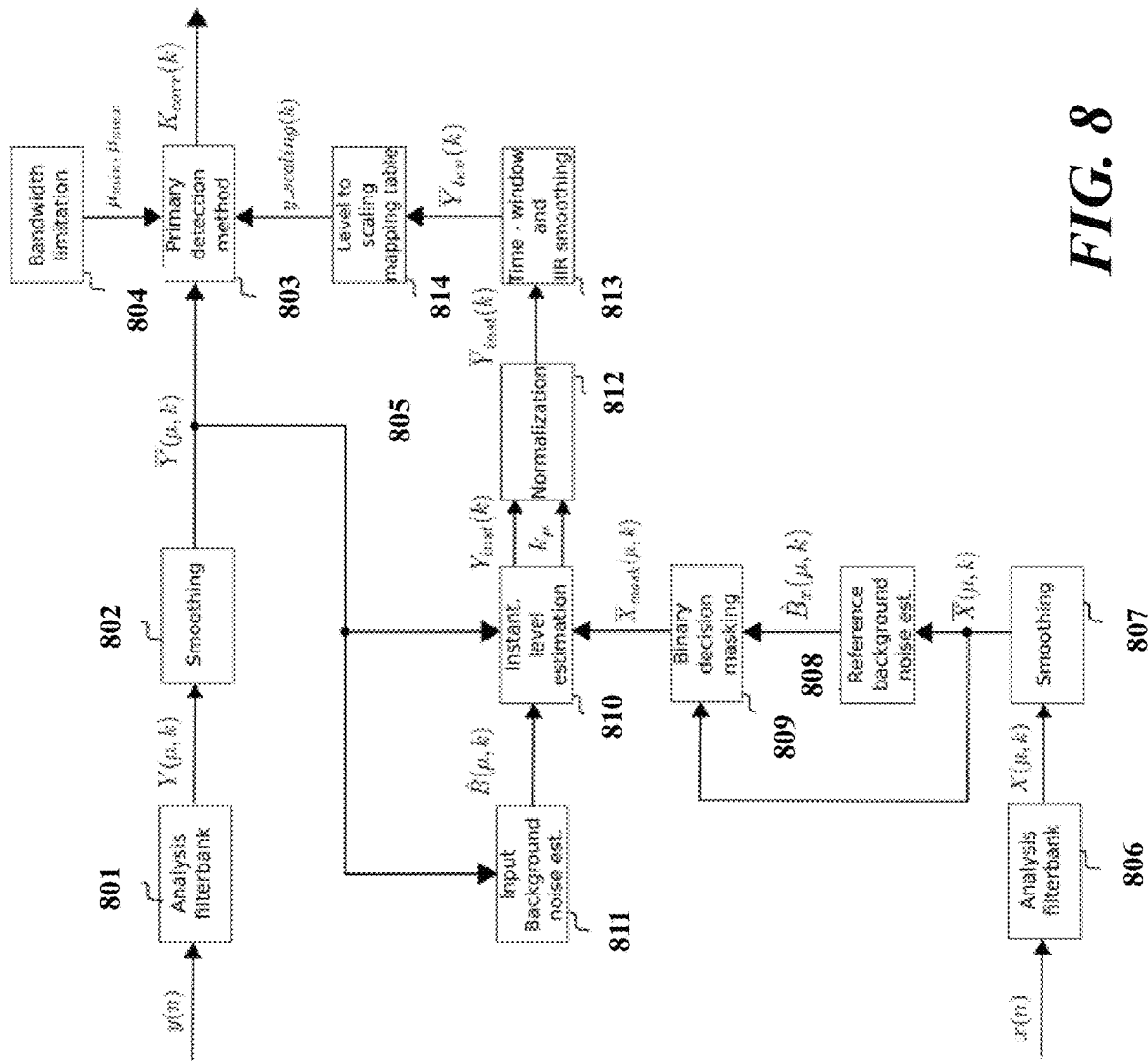
FIG. 8 is block diagram illustrating an exemplary dynamic noise suppression system according to one or more embodiments.

A formant detection system is shown in FIG. 8. Based on the considerations presented above, an exemplary formant detection system, which can be applied in the system described above in connection with FIG. 1 but can also be applied in connection with other systems and as a standalone system, may comprise an input (time-to-frequency) domain transformer, e.g., an analysis filter bank 801, which transforms the time-domain input signal $y(n)$ into a spectrum of the input signal $y(n)$, i.e., the input spectrum $Y(\mu,k)$, wherein $\mu,k$ again designates the $\mu$th subband for the time-frame $k$. The input signal $y(n)$ is again a noisy speech signal, i.e., it includes speech components and noise components. Accordingly, the input spectrum $Y(\mu,k)$ includes a speech spectrum that is the spectrum of the speech components and a noise spectrum that is the spectrum of the noise components. A smoothing filter 802 operatively coupled with the analysis filter bank 801 smoothes the magnitudes of the input spectrum $Y(\mu,k)$ to provide the smoothed-magnitude input spectrum $\overline{Y}(\mu, k)$. When used with the system described above in connection with FIG. 1, the analysis filter bank 101 and the smoothing filter 102 may be employed instead of the analysis filter bank 801 and the smoothing filter 802 in the system shown in FIG. 8.

A detection block 803 operatively coupled to the smoothing filter 802 performs a spectral auto-correlation operation on the smoothed input spectrum $\overline{Y}(\mu, k)$ over a reduced number of subbands between the lower subband $\mu_{min}$ and the upper subband $\mu_{max}$ such as set forth in Equation (30) and determined by a bandwidth limitation block 804. The detection block 803 outputs the auto-correlation factor $K_{corr}(k)$ which is indicative of the presence of formants included in the input signal $y(n)$. The detection block 803 further receives the scaling factor y_scaling(k), which is derived from the smoothed input spectrum $\overline{Y}(\mu, k)$, and the smoothed reference spectrum $\overline{X}(\mu, k)$. The smoothed reference spectrum $\overline{X}(\mu, k)$ may be received, for example, from the analysis filter bank 111 via the smoothing filter 112 if the formant detection system is applied in the system shown in FIG. 1, or from an analysis filter bank 806 via a smoothing filter 807 if the formant detection system is used in other applications or as a standalone system. As described in connection with analysis filter bank 111 and smoothing filter 112, the reference signal $x(n)$ is transformed into the reference spectrum $X(\mu,k)$ whose magnitudes are smoothed to provide the smoothed (magnitude) reference spectrum $\overline{X}(\mu, k)$. The reference spectrum $X(\mu,k)$ is derived from the reference signal $x(n)$ by spectral transformation.

In a reference background noise estimation block 808, the estimated background noise PSD $\hat{B}_x(\mu, k)$ of the smoothed magnitude reference spectrum $\overline{X}(\mu, k)$ is estimated and supplied to a binary decision masking block 809. The binary decision masking block 809 further receives the estimated background noise PSD $\hat{B}_x(\mu, k)$ as well as the smoothed (magnitude) reference spectrum $\overline{X}(\mu, k)$, and determines therefrom the reference mask $X_{mask}(\mu, k)$. The reference mask $X_{mask}(\mu, k)$ is supplied to an instant level estimator 810 which receives the smoothed input spectrum $\overline{Y}(\mu, k)$ and, from an input noise estimation block 811, the estimated background noise PSD $\hat{B}(\mu, k)$ of the smoothed input spectrum $\overline{Y}(\mu, k)$. In the level estimator 810, based on the bin count $k_\mu$ and the instantaneous level estimate $K_{inst}(k)$ the normalized instantaneous level estimate $\overline{Y}_{inst}(k)$ is generated, which is time windowed and IIR filtered in a smoothing block 813 to provide the final level estimate $\overline{Y}_{lev}(k)$ of the noisy input spectrum $Y(k)$. The final level estimate $\overline{Y}_{lev}(k)$ is mapped into the scaling factor y_scaling(k) in a scaling block 814.

Figure 9:
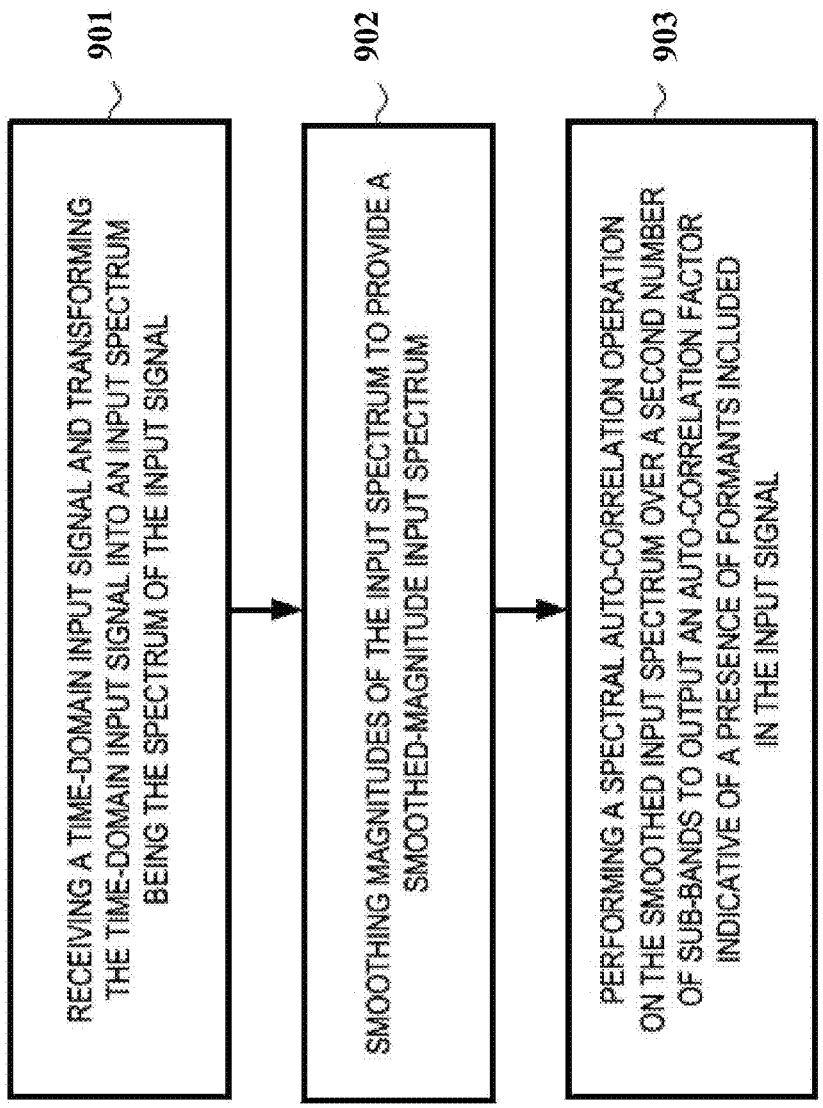
FIG. 9 is a flow chart illustrating an exemplary noise suppression method according to one or more embodiments.

An exemplary formant detection method is depicted in FIG. 9 and includes receiving a time-domain input signal and transforming the time-domain input signal into an input spectrum being the spectrum of the input signal (procedure 901), wherein the time-domain input signal includes a speech signal with formants and the input spectrum including a first number of subbands. The method further includes smoothing magnitudes of the input spectrum to provide a smoothed-magnitude input spectrum (procedure 902). The method further includes performing a spectral auto-correlation operation on the smoothed input spectrum over a second number of subbands to output an auto-correlation factor indicative of a presence of formants included in the input signal (procedure 903), wherein the second number is equal to or less than the first number.

While this disclosure has been particularly shown and described with references to exemplary embodiments thereof, it will be understood by those skilled in the art that various changes in form and details may be made therein without departing from the scope of the claimed embodiments.

What is claimed is:
1. A noise suppression system comprising:
an input domain transformer configured to receive a time-domain input signal and to transform the time-domain input signal into an input spectrum that is the spectrum of the input signal, the input signal including speech components and noise components, and the input spectrum including a speech spectrum that is the spectrum of the speech components and a noise spectrum that is the spectrum of the noise components;

an input smoothing filter operatively coupled with the input domain transformer and configured to smooth magnitudes of the input spectrum to provide a smoothed-magnitude input spectrum;

a desired noise shape determination block operatively coupled with the input smoothing filter and configured to determine a desired noise shape of the noise spectrum dependent on the smoothed-magnitude input spectrum;

a suppression factors determination block operatively coupled with the desired noise shape determination block and the input smoothing filter, and configured to determine a set of suppression factors based on the desired noise shape and the smoothed-magnitude input spectrum; and a filter coefficient determination block coupled with the suppression factors determination block and configured to determine noise suppression filter coefficients from the desired noise shape of the noise spectrum, wherein the desired noise shape determination block is further configured to determine the desired noise shape of the noise spectrum by multiplying a previous estimate of a noise magnitude shape of the smoothed-magnitude input spectrum with a dynamically calculated value or an incremental or decremental constant, depending on ratio sign and level.

2. The system of claim 1, wherein the desired noise shape determination block is further configured to determine the desired noise shape of the noise spectrum based on a long-term estimate of the smoothed-magnitude input spectrum.

3. The system of claim 2, wherein the desired noise shape determination block is further configured to determine the desired noise magnitude shape of the noise spectrum by dynamically determining a ratio of a current frame to a desired magnitude of the desired noise magnitude shape based on a threshold which can be changed or tuned.

4. The system of claim 2, wherein determining the desired noise magnitude shape of the noise spectrum by the desired noise shape determination block includes an individual hold time, during which the desired noise magnitude shape determination of passing thresholds follows the previous function rule until the hold time expires.

5. The system of claim 1, wherein the suppression factors determination block is further configured to apply an over-estimation factor to adjust the overall level of the desired noise magnitude shape.

6. The system of claim 1, further comprising a sub-band domain smoothing filter operatively coupled to the suppression factors determination block and to the filter coefficient determination block, and configured to smooth suppression factors along a frequency axis.

7. The system of claim 6, wherein the suppression factors are smoothed along the frequency axis with a zero-phase infinite impulse response filter.

8. The system of claim 1, wherein the filter coefficient determination block is further configured to determine the noise suppression filter coefficients by at least one of shifting the suppression factors by an amount representative of a desired suppression, switching between the Wiener filter coefficients and the dynamic suppression filter coefficients dependent on the formant detection signal, and using tunable parameters.

9. A noise suppression method comprising:

transforming a time-domain input signal into an input spectrum that is the spectrum of the input signal, the input signal comprising speech components and noise components, and the input spectrum comprising a speech spectrum that is the spectrum of the speech components and a noise spectrum that is the spectrum of the noise components;

smoothing magnitudes of the input spectrum to provide a smoothed-magnitude input spectrum;

determining a desired noise shape of the noise spectrum dependent on the smoothed-magnitude input spectrum by multiplying a previous estimate of a noise magnitude shape of the smoothed-magnitude input spectrum with a dynamically calculated value or an incremental or decremental constant, depending on ratio sign and level;

determining a set of suppression factors based on the desired noise shape and the smoothed-magnitude input spectrum; and determining noise suppression filter coefficients from the desired noise shape of the noise spectrum.

10. A formant detection system comprising:

an input domain transformer configured to receive a time-domain input signal and to transform the time-domain input signal into an input spectrum, the time-domain input signal including a speech signal with formants and the input spectrum including a first number of subbands;

an input smoothing filter operatively coupled with the input domain transformer and configured to smooth magnitudes of the input spectrum to provide a smoothed-magnitude input spectrum; and a detection block operatively coupled to the input smoothing filter and configured to perform a spectral auto-correlation operation on the smoothed input spectrum over a second number of subbands to output an auto-correlation factor indicative of a presence of formants included in the input signal, the second number being equal to or less than the first number, wherein the detection block is further configured to normalize the auto-correlation factor by dividing the auto-correlation factor by the second number of subbands plus one to provide a normalized correlation factor.

11. The formant detection system of claim 10, wherein the second number of subbands being at least one of equal to and less than the first number.

12. The formant detection system of claim 10, wherein the detection block is further configured to scale the smoothed input spectrum by multiplying the smoothed input spectrum with a scaling factor to provide a scaled smoothed input spectrum before performing the auto-correlation.

13. The formant detection system of claim 10, further comprising a scaling controller operatively coupled to the detection block and configured to determine the scaling factor from a one-to-one mapping function based on estimated levels of the smoothed input spectrum.

14. The formant detection system of claim 10, further comprising an input spectrum level estimator operatively coupled to the input smoothing filter and configured to provide the estimated levels of the smoothed input spectrum by determining a long-term average of the smoothed input spectrum.

15. The formant detection system of claim 14, wherein the input spectrum level estimator is further configured to determine the long-term average by performing a time window averaging a number of frames of estimated instant levels of the smoothed input spectrum, thereby providing a time-window average of the estimated smoothed input spectrum.

16. The formant detection system of claim 14, wherein the input spectrum level estimator is further configured to determine the long-term average by performing an infinite impulse response filter based smoothing of the time-window average of the estimated smoothed input spectrum.

17. The formant detection system of claim 10, further comprising:
- a reference domain transformer configured to receive a time-domain reference signal and to transform the time-domain reference signal into a reference spectrum that is the spectrum of the reference signal;
- a reference smoothing filter operatively coupled with the reference domain transformer and the input spectrum level estimator and scaling controller, the reference smoothing filter being configured to smooth magnitudes of the reference spectrum to provide a smoothed-magnitude input spectrum,
- wherein the input spectrum level estimator is further operatively coupled to the reference domain transformer, the level estimator further configured to estimate the time-window average of the smoothed input spectrum based on the input spectrum and the reference spectrum.

18. The formant detection system of claim 10, further comprising:
- a reference background noise estimator operatively coupled to reference smoothing filter and configured to estimate the background noise contained in the smoothed reference spectrum; and
- a masking block operatively coupled to reference background noise estimator and the input spectrum level estimator, the masking block configured to mask the smoothed input spectrum with a mask derived from the background noise contained in the smoothed reference spectrum.

* * * * *